(12) United States Patent
Matsui

(10) Patent No.: US 10,067,833 B2
(45) Date of Patent: Sep. 4, 2018

(54) STORAGE SYSTEM

(71) Applicant: HITACHI, LTD., Tokyo (JP)

(72) Inventor: Akira Matsui, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 15/124,040

(22) PCT Filed: Jul. 31, 2014

(86) PCT No.: PCT/JP2014/070224
§ 371 (c)(1),
(2) Date: Sep. 7, 2016

(87) PCT Pub. No.: WO2016/017002
PCT Pub. Date: Feb. 4, 2016

(65) Prior Publication Data
US 2017/0017550 A1    Jan. 19, 2017

(51) Int. Cl.
| | |
|---|---|
| *G06F 11/00* | (2006.01) |
| *G06F 11/14* | (2006.01) |
| *G06F 3/06* | (2006.01) |
| *G06F 11/20* | (2006.01) |

(52) U.S. Cl.
CPC ............ *G06F 11/1415* (2013.01); *G06F 3/06* (2013.01); *G06F 11/2094* (2013.01); *G06F 2201/805* (2013.01)

(58) Field of Classification Search
CPC .... G06F 11/1415; G06F 11/2094; G06F 3/06; G06F 3/0661; G06F 3/0689
See application file for complete search history.

(56) References Cited

U.S. PATENT DOCUMENTS

| | | | |
|---|---|---|---|
| 5,574,952 A | * | 11/1996 | Brady .................. G06F 3/0601 341/95 |
| 5,859,960 A | | 1/1999 | Kurihara et al. |
| 2011/0238885 A1 | | 9/2011 | Kitahara et al. |
| 2012/0297244 A1 | | 11/2012 | Kitahara et al. |

(Continued)

FOREIGN PATENT DOCUMENTS

| | | |
|---|---|---|
| JP | 05-11934 A | 1/1993 |
| JP | 07-311661 A | 11/1995 |

(Continued)

OTHER PUBLICATIONS

EMC Data Compression, Sep. 2010, 21 pages (Year: 2010).*
International Search Report of PCT/JP2014/070224 dated Oct. 14, 2014.

*Primary Examiner* — Michael C Maskulinski
(74) *Attorney, Agent, or Firm* — Mattingly & Malur, PC

(57) ABSTRACT

A storage system according to the present invention comprises a controller and multiple storage devices, constitutes a RAID group from (n+m) number of storage devices, wherein the storage system stores write data from a host computer to n number of storage devices, and stores redundant data generated from the n number of data to m number of storage devices. When failure occurs to at least one storage device, the controller reads data in a compressed state and redundant data from each of the storage devices where failure has not occurred in the storage devices constituting the RAID group, and transmits the read data in the compressed state to the storage device which is a data recovery destination.

15 Claims, 24 Drawing Sheets

(56) References Cited

U.S. PATENT DOCUMENTS

2013/0290629 A1* 10/2013 Uehara ................ G06F 3/0688
711/114
2014/0317340 A1* 10/2014 Nishina ................ G06F 3/0608
711/103

FOREIGN PATENT DOCUMENTS

JP 10-254634 A 9/1998
JP 2012-519319 A 8/2012

* cited by examiner

STORAGE SPACE OF RAID GROUP
20

| T1001 DEVICE # | T1002 DEVICE TYPE | T1003 BELONG-ING RG # | T1004 DEVICE STATUS | T1005 COMPRESSION FUNCTION SUPPORT | T1006 PARITY OPERATION FUNCTION SUPPORT | T1007 SIZE |
|---|---|---|---|---|---|---|
| 0 | FMPK | 0 | NORMAL | SUPPORTED | SUPPORTED | 10240GB |
| 1 | FMPK | 0 | FAILURE RECOVERY ONGOING (RECOVERY SOURCE) | SUPPORTED | SUPPORTED | 10240GB |
| 2 | FMPK | 0 | NORMAL | SUPPORTED | SUPPORTED | 10240GB |
| 3 | FMPK | 0 | NORMAL | SUPPORTED | SUPPORTED | 10240GB |
| 4 | FMPK | 0 | FAILURE RECOVERY ONGOING (RECOVERY DESTINATION) | SUPPORTED | SUPPORTED | 10240GB |
| 5 | FMPK | UNALLO-CATED (SPARE) | NORMAL | SUPPORTED | SUPPORTED | 10240GB |
| 6 | FMPK | UNALLO-CATED | NORMAL | SUPPORTED | SUPPORTED | 5120GB |
| 7 | FMPK | UNALLO-CATED | BLOCKED | SUPPORTED | SUPPORTED | 10240GB |
| 8 | FMPK | 1 | NORMAL | SUPPORTED | SUPPORTED | : |
| : | : | : | : | : | : | : |
| 16 | HDD | 2 | NORMAL | NOT SUPPORTED | NOT SUPPORTED | : |
| : | : | : | : | : | : | |

Fig. 6

| RG # | BELONGING DEVICE # POSITION NUMBER (T1102) | | | | | | | | RAID CONFIGU-RATION (T1103) | RG CAPACITY (T1104) | STRIPE SIZE (T1105) | RG STATUS (T1106) | COMPRESSION (T1107) | PARITY OPERATION (T1108) |
|---|---|---|---|---|---|---|---|---|---|---|---|---|---|---|
| (T1101) | 0 | 1 | 2 | 3 | 4 | 5 | 6 | 7 | | | | | | |
| 0 | 0 | 1 | 2 | 3 | – | – | – | – | RAID5 (3D+1P) | 24.0TB | 256KB | FAILURE RECOVERY ONGOING | PERFORMED | PERFORMED |
| 1 | 8 | 9 | 10 | 11 | 12 | 13 | 14 | 15 | RAID6 (6D+2P) | 48.0TB | 64KB | NORMAL | PERFORMED | PERFORMED |
| 2 | 16 | 17 | 18 | 19 | – | – | – | – | RAID10 (2D+2D) | 6.6TB | 256KB | NORMAL | NOT PERFORMED | NOT PERFORMED |
| 3 | UNALLOCATED | | | | | | | | ... | ... | ... | ... | ... | ... |
| ... | | | | | | | | | | | | | | |

T1200

| T1201 | T1202 | T1203 | T1204 |
|---|---|---|---|
| LU# | RG# | LU START OFFSET WITHIN RG | LU SIZE |
| 0 | 0 | 0x0 | 100GB |
| 1 | 0 | 0xC800000 | 500GB |
| 2 | 0 | 0x4B000000 | 50GB |
| : | : | : | : |
| 5 | 2 | 0x20000 | 10GB |
| : | : | : | : |

| LOGICAL PAGE NUMBER (T2101) | PHYSICAL PAGE NUMBER (T2102) | SIZE (COMPRESSED SIZE) (T2103) | OFFSET (T2104) |
|---|---|---|---|
| 0 | 10 | 4KB | 0KB |
| 1 | 500 | 1KB | 7KB |
|  | 42 | 1KB | 0KB |
| 2 | NULL | — | — |
| : | : | : | : |
| 1000 | 10 | 2KB | 4KB |
| : | : | : | : |

| ENTRY | CONTENTS |  |
|---|---|---|
| PHYSICAL CAPACITY (NON-COMPRESSED CAPACITY) | 1634GB | T2001 |
| DATA COMPRESSION (EXECUTE OR NOT) | YES | T2002 |
| LOGICAL CAPACITY | 10240GB | T2003 |
| CONNECTION DKC TYPE | Hitachi VSP | T2004 |
| BELONGING RAID GROUP CONFIGURATION | RAID5(3D+1P) | T2005 |
| POSITION WITHIN RAID GROUP | 2 | T2006 |
| BELONGING RG # | 0 | T2007 |
| : | : |  |

TRANSFER RESULT — 3011

| ENTRY | CONTENTS | |
|---|---|---|
| FAILURE RG # | 0 | T1501 |
| RECOVERY SOURCE DEVICE | FMPK#1 | T1502 |
| RECOVERY DESTINATION DEVICE | FMPK#4 | T1503 |
| CORRECTION METHOD | METHOD 3 (FMPK COOPERATION COMPRESSION COPY) | T1504 |
| RECOVERY DEVICE CAPACITY | 10240GB | T1505 |
| COPY METHOD BITMAP<br>0: COPY DIRECTLY FROM RECOVERY SOURCE<br>1: CORRECTION COPY | 000000100011111000 ··· | T1506 |
| RECOVERY COMPLETED OFFSET | 0x10500000 | T1507 |

| LOGICAL PAGE NUMBER (T2501) | ADDRESS (T2502) | NUMBER OF TIMES (T2503) |
|---|---|---|
| 0 | 0x80000000 | 1 |
| 1 | 0x80001000 | 2 |
| 2 | NULL | 0 |
| : | : | |

| |  |
|---|---|
| OPCODE (SHOWING COMPRESSED INTERMEDIATE PARITY OPERATION COMMAND) | 3201' |
| WRITE START OFFSET (LBA) | 3202' |
| WRITE SIZE (EXPANDED SIZE) | 3203' |
| BUFFER ADDRESS | 3204' |
| TRANSFER SIZE (COMPRESSED SIZE) | 3205' |
| POSITION WITHIN RAID GROUP (READ SOURCE FMPK) | 3206' |

| | |
|---|---|
| OPCODE (SHOWING PARITY COMMIT COMMAND) | 3301 |
| WRITE START OFFSET (LBA) | 3302 |
| WRITE SIZE (EXPANDED SIZE) | 3303 |

STORAGE SYSTEM

TECHNICAL FIELD

The present invention relates to a data recovery technique in a storage system.

BACKGROUND ART

Many storage systems adopt a so-called RAID (Redundant Arrays of Inexpensive/Independent Disks) technique to enhance the availability of the system. A RAID technique is a technique for computing parity or other redundant data from the write data received from a superior device such as a host computer, and storing the write data and the parity in a dispersed manner to different storage devices. By adopting the RAID technique, even when failure occurs to a portion of the storage devices and data cannot be read from those storage devices, the information stored in the other storage devices can be used to regenerate data.

In the RAID technique, the load of the process performed by the controller (storage controller) installed in the storage system or the amount of data transferred between components within the storage system (such as between the storage controller and the storage device) is increased in order to compute the parity. Various techniques have been devised in the prior art to suppress the increase of processing loads and the amount of data transfer. For example, Patent Literature 1 teaches a storage system having the function for generating parity and the like provided to the storage device side to suppress the amount of data transfer that occurs between the storage controller and the storage device.

CITATION LIST

Patent Literature

[PTL 1] US Patent Application Publication No. 2013/0290629

SUMMARY OF INVENTION

Technical Problem

A characteristic feature of the RAID technique is that data stored in a storage device where failure has occurred can be recovered (regenerated), as mentioned earlier. However, in order to recover data, a process must be performed to read all the data stored in the storage devices where failure has not occurred, perform a given arithmetic operation to the read data to regenerate data, and write the regenerated data to a new storage device (spare drive or spare device), wherein during the process, a large amount of data must be transferred among the storage controller and storage devices.

Especially, the storage capacity of storage devices has been increasing in recent years, and it requires long time just to read all the data stored in the storage devices. Therefore, there is a tendency that the time required to perform the data recovery processing using the RAID technique is elongated. During the data recovery processing, redundancy cannot be ensured, so that when failure occurs to another storage device during the recovery processing, data recovery becomes impossible. Patent Literature 1 discloses performing data recovery using a parity generating function provided to the storage device side, but it is still required to read all the data stored in the storage devices, so that significant reduction of the data recovery processing time cannot be realized.

Solution to Problem

The storage system according to one preferred embodiment of the present invention includes a controller and multiple storage devices, constituting a RAID group from (n+m) number of storage devices, and stores a write data from a host computer in n number of storage devices and stores redundant data generated from the n number of data in m number of storage devices. When failure occurs to at least one storage device, the controller reads data and redundant data in a compressed state from each of the storage devices where failure has not occurred out of the storage devices constituting the RAID group, and transmits the read data in the compressed state to a data recovery destination storage device.

Advantageous Effects of Invention

The present invention enables to reduce the amount of data being transferred during data recovery, and to shorten the data recovery time.

BRIEF DESCRIPTION OF DRAWINGS

FIG. 5 is a view illustrating a configuration of a device management table.

FIG. 6 is a view illustrating a configuration of an RG management table.

FIG. 9 is a view illustrating a configuration of a mapping table.

FIG. 10 is a view illustrating a configuration of a state management table.

FIG. 18 is a view showing a configuration of a copy management table.

FIG. 18 is a detailed flowchart of a copy recovery processing.

FIG. 24 is a view showing a configuration of a staging information management table.

FIG. 25 is a view showing a format of a compressed intermediate parity operation command.

FIG. 26 is a view showing a format of a parity commit command.

DESCRIPTION OF EMBODIMENTS

Now, the storage system according to one preferred embodiment of the present invention will be described with reference to the drawings. The present invention is not restricted to the preferred embodiments illustrated hereafter.

Embodiment 1

Figure 1:
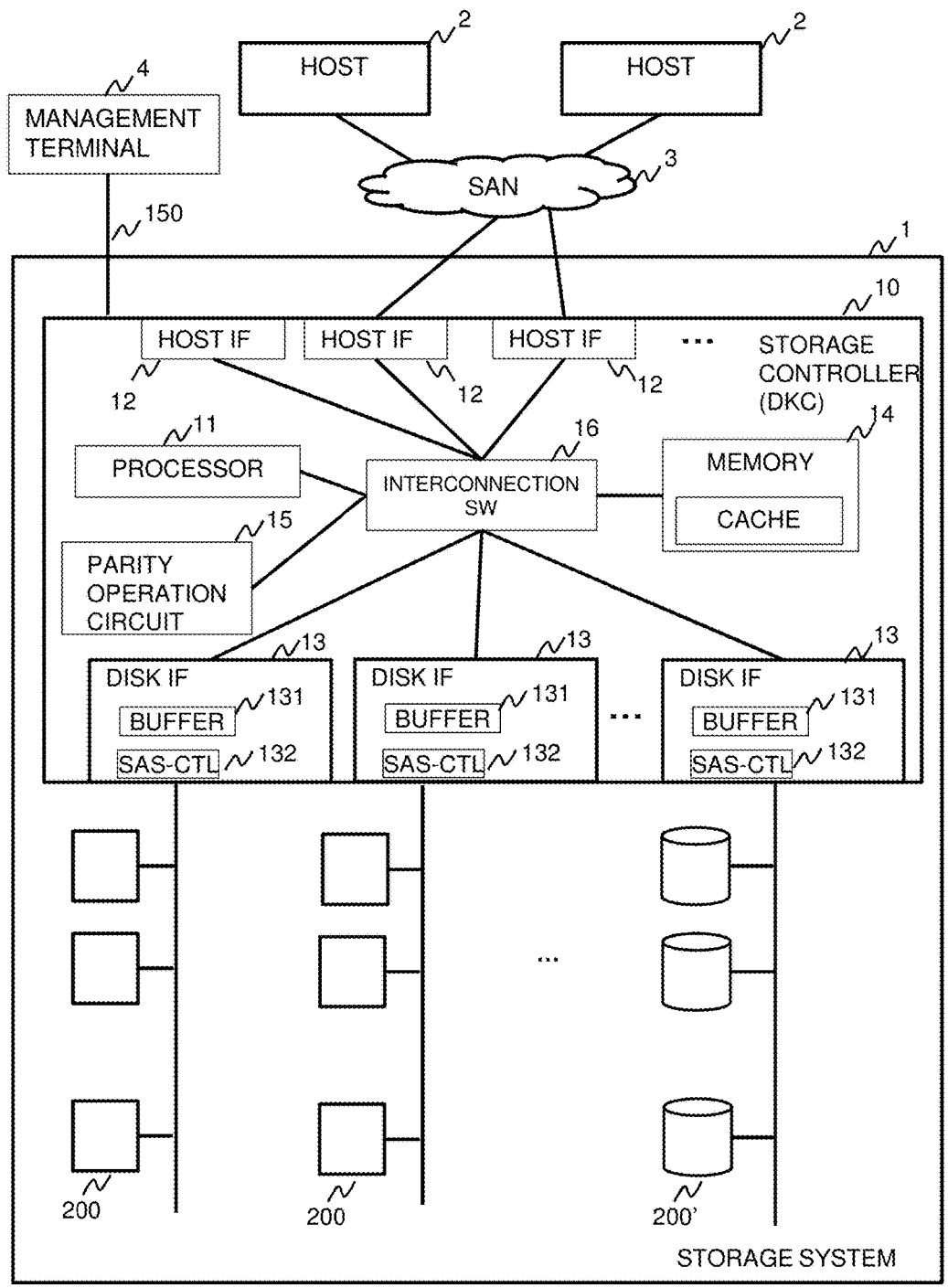
FIG. 1 is a configuration diagram of a storage system according to a preferred embodiment of the present invention.

FIG. 1 illustrates a configuration of a storage system 1 according to Embodiment 1. The storage system 1 has a storage controller (DKC) 10, and multiple storage devices (200, 200') connected to the storage controller 10.

The storage devices 200 and 200' are final storage media for storing write data from a host 2 or other superior devices. The storage system 1 according to the preferred embodiment of the present invention can use, as final storage devices, HDDs (Hard Disk Drives) 200' having magnetic disks as the storage media, and FMPKs (Flash Memory PacKages) 200 using nonvolatile semiconductor memories such as flash memories as the storage media. However, it is also possible to use other storage devices. The storage devices 200 and 200' communicate with the storage controller 10 (hereinafter abbreviated as "DKC 10") in compliance with SAS (Serial Attached SCSI) standards, as an example.

The DKC 10 manages multiple FMPKs as one or multiple RAID (Redundant Arrays of Inexpensive/Independent Disks) groups 145.

The DKC 10 has one or more hosts 2 and a management terminal 4 connected thereto. The DKC 100 and the host 2 are connected via a SAN (Storage Area Network) 1 formed using a Fibre Channel, for example. The DKC 10 and the management terminal 4 are connected via a network 150 formed using an Ethernet, for example.

The DKC 10 has, at least, a processor 11, a host interface (denoted as "host I/F" in the drawing) 12, a disk interface (denoted as "disk I/F" in the drawing) 13, a memory 14, and a parity operation circuit 15. The processor 11, the host I/F 12, the disk I/F 13, the memory 14 and the parity operation circuit 15 are mutually connected via an interconnection switch (interconnection SW) 16. Multiple number of each component described above are installed in the DKC 10 to ensure high performance and high availability. However, it is possible to adopt a configuration where the number of components installed in the DKC 10 is one.

The disk I/F 13 has, at least, a buffer 131, an interface controller 132 (denoted as "SAS-CTL" in the drawing) for communicating with the storage devices 200 and 200', and a transfer circuit (not shown). The interface controller 132 is for converting a protocol used in the storage devices 200 and 200' (one example of which is a SAS) to a communication protocol (one example of which is a PCI-Express) used within the DKC 10. In the present embodiment, a SAS controller (hereinafter abbreviated as "SAS-CTL") is used as the interface controller 132, since the storage devices 200 and 200' perform communication in compliance with SAS standards. In FIG. 1, only one SAS-CTL 132 is illustrated in one disk I/F 13, but it is also possible to adopt a configuration where multiple SAS-CTLs 132 exist in one disk I/F 13.

The disk I/F 13 reads data from the FMPK 200, for example, and stores the read data temporarily to the buffer 131. The data stored in the buffer 143 is transmitted to the memory 14 or a buffer in a different disk I/F 13 via the transfer circuit. The buffer 131 can be composed of a volatile semiconductor memory, for example, but it can also be configured using a nonvolatile memory.

The host I/F 12 has, at least, an interface controller, a buffer, and a transfer circuit (not shown), similar to the disk I/F 13. The interface controller is for converting a communication protocol (such as a Fibre Channel) used between the host 2 and the DKC 10 to a communication protocol used within the DKC 10. The buffer is for temporarily storing data from the host 2 (in contrast, it is sometimes used for temporarily storing the data to be transferred from the memory 14 to the host 2).

The parity operation circuit 15 is hardware for generating redundant data required in a RAID technique. Examples of redundant data generated by the parity operation circuit 15 include exclusive OR (XOR), Reed-Solomon code, and so on.

The processor 11 processes I/O requests arriving from the host I/F 12. The memory 14 is used for storing programs executed by the processor 11 and various management information of the storage system 1 used by the processor. Further, the memory 14 is also used for temporarily storing the I/O target data for the storage devices 200 and 200'. Hereafter, the storage area within the memory 14 used for temporarily storing the I/O target data for the storage devices 200 and 200' is referred to as "cache". The memory 14 is composed of volatile storage media such as DRAM, SRAM and the like, but as another embodiment, the memory 14 can also be composed of nonvolatile memories.

The storage system 1 can have multiple types of storage devices, such as FMPKs 200 and HDDs 200', installed thereto, as mentioned earlier. However, in the following description, unless stated otherwise, we will assume the configuration that only FMPKs 200 are installed in the storage system 1.

Figure 2:
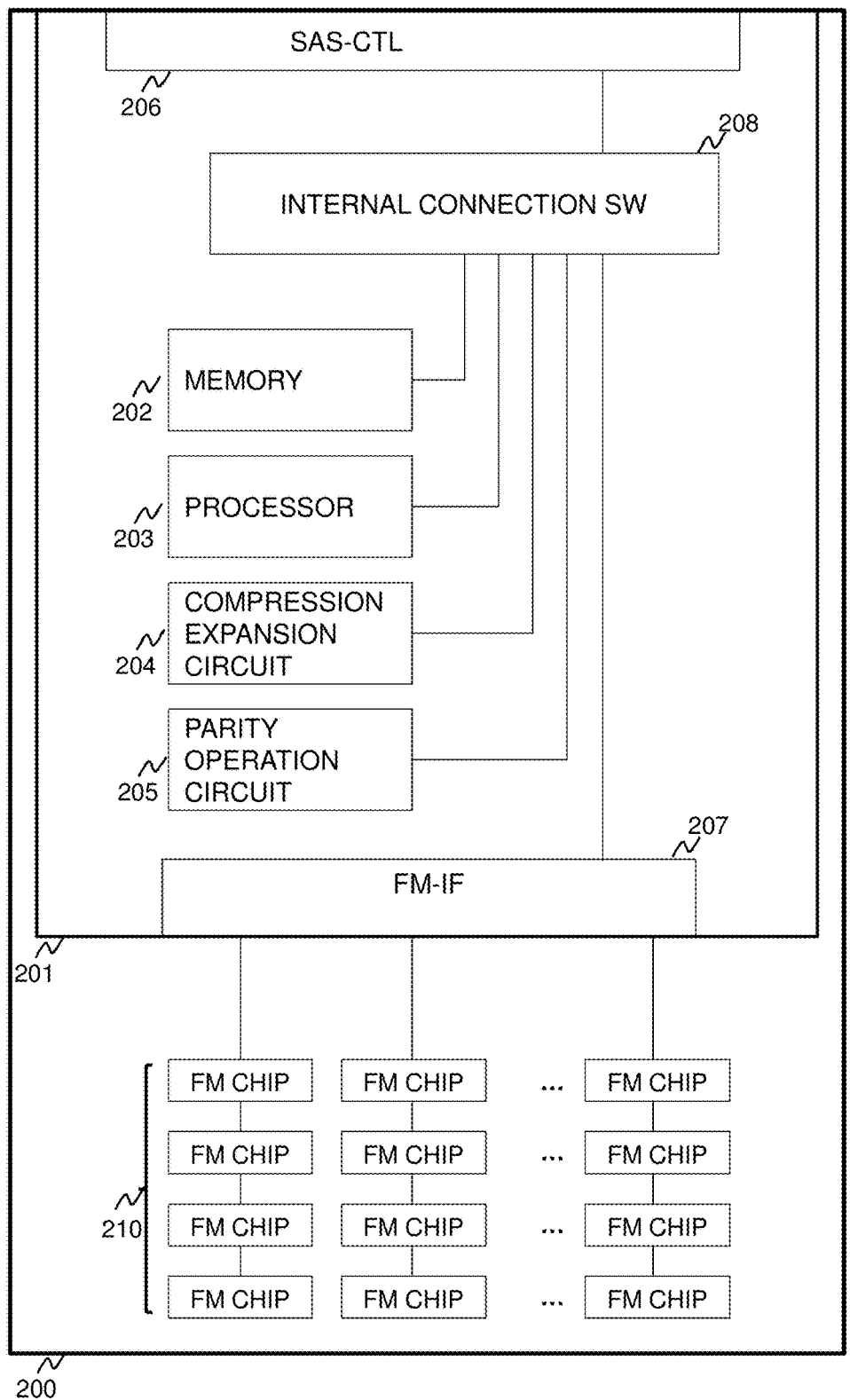
FIG. 2 is a configuration diagram of an FMPK.

The configuration of the FMPK 200 will be described with reference to FIG. 2. The FMPK 200 is composed of a device controller (FM controller) 201 and multiple FM chips 210. The FM controller 201 has a memory 202, a processor 203, a compression expansion circuit 204 for compressing and expanding data, a parity operation circuit 205 for computing parity, a SAS-CTL 206, and an FM-IF 207. The memory 202, the processor 203, the compression expansion circuit 204, the parity operation circuit 205, the SAS-CTL 206 and the FM-IF 207 are mutually connected via an internal connection switch (internal connection SW) 208.

The SAS-CTL 206 is an interface controller for realizing communication between the FMPK 200 and the DKC 10. The SAS-CTL 206 is connected to the SAS-CTL 132 in the DKC 10 via a transmission line (SAS link). Further, the FM-IF 207 is an interface controller for realizing communication between the FM controller 201 and the FM chips 210.

The processor 203 performs processes related to the various commands arriving from the DKC 10. The programs executed by the processor 203 and various management information are stored in the memory 202. A volatile memory such as a DRAM is used as the memory 202. However, a nonvolatile memory can also be used as the memory 202.

The compression expansion circuit 204 is a hardware having a function to compress data or to expand the compressed data. The parity operation circuit 205 is a hardware having a similar function as the parity operation circuit 15 in the DKC 10, that is, a function to generate redundant data required for the RAID technique.

The FM chip 210 is a nonvolatile semiconductor memory chip, one example of which is a NAND-type flash memory. As well known, data is read or written in page units in a flash memory, and data is erased in block units, which is an assembly of multiple pages. A page to which data is written once cannot be overwritten, and in order to re-write data to a page to which data has once been written, the whole block including the relevant page must be erased. Therefore, the FMPK 200 will not provide the storage areas of the FM chips 210 directly to the DKC 10 to which the FMPK 200 is connected, but provides a logical storage space instead.

Further, the FMPK 200 can store a write data from the DKC 10 into the FM chips 210 in a compressed manner using the compression expansion circuit 204. However, in principle, data compression is performed transparently to the DKC 10. The FMPK 200 provides a storage space (logical address space) having a given size to the DKC 10. When the DKC 10 writes data to the FMPK 200, it issues a write command designating the address within this logical address space and the size of the write target data. As an example, we will assume that the DKC 10 has transmitted to the FMPK 200 a write command (and 48 KB write data) to write the 48 KB data to the head (address 0) of the logical address space. We will assume that as a result of the FMPK 200 compressing this 48 KB data, an 8KB compressed data is obtained, and that the 8KB compressed data is stored in the FM chips 210. In this state, when the DKC 10 reads this data, the 48 KB data stored as mentioned earlier can be read by issuing a read command designating the beginning (address 0) of the logical address space and the read data size (such as 48 KB). This is because during the read processing, the FMPK 200 expands (restores) the 8 KB compressed data to the 48 KB data via the compression expansion circuit 204, and returns the expanded data to the DKC 10. Therefore, it seems to the DKC 10 as if data is stored in a non-compressed state in the logical address space.

In the above description, an example has been illustrated of a case where compression and expansion of data is performed by a hardware called the compression expansion circuit 204, but the compression and expansion of data is not necessarily performed using hardware. The compression and expansion of data can be done by the processor 203 executing a program for performing compression and expansion. The same applies for the parity operation circuit 205, and parity operation is not necessarily performed by a hardware called the parity operation circuit 205. Parity operation can be realized by the processor 203 executing a program for performing parity operation.

Further, in the above description, an example has been illustrated where the FMPK 200 has the compression/expansion function and the parity operation function, but it is possible to have an FMPK 200 that does not have the compression expansion function or the parity operation function installed in the storage system 1. If the FMPK 200 is not equipped with the compression and expansion function, data will not be stored in a compressed manner. If the FMPK 200 is not equipped with a parity operation function, the DKC 10 performs parity generation.

Next, we will describe the concept of the storage area used in the storage system 1. The storage system 1 manages multiple FMPKs 200 as one RAID (Redundant Arrays of Inexpensive/Independent Disks) group. When failure occurs to one (or two) FMPKs 200 within the RAID group and data cannot be accessed, the data stored in the FMPK 200 to which the failure has occurred can be recovered using the data in the remaining FMPKs 200. Further, a portion (or all) of the storage area within the RAID group is provided to a superior device such as the host 2.

Figure 3:
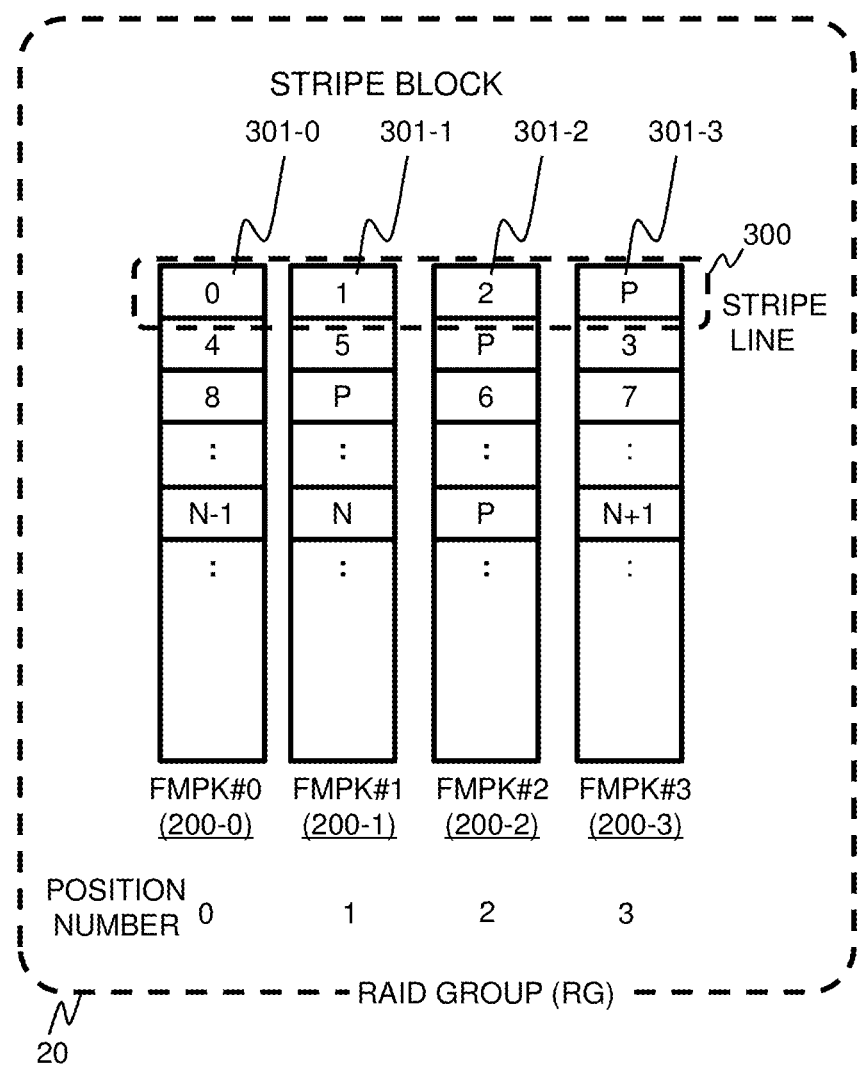
FIG. 3 is an explanatory view of the contents of a storage area within a RAID group.

The storage areas in a RAID group will be described with reference to FIG. 3. In FIG. 3, the FMPK #x (x is a number from 0 to 3) represents the storage space that the FMPK 200 provides to the DKC 10. The DKC 10 composes one RAID group 20 from multiple (four, in the example of FIG. 3) FMPKs 200, and manages the storage spaces of the respective FMPKs (FMPK #0 (200-0) through FMPK #3 (200-3)) belonging to the RAID group 20 to multiple fixed-size storage areas called stripe blocks.

Further, in FIG. 3, an example is illustrated where the RAID level (showing the data redundancy method in the RAID technique, and in general, there are six types of levels from RAID1 to RAID6) of the RAID group 20 is RAID5. In the DKC 10, as illustrated in FIG. 3, the boxes referred to as "0", "1", "P" and the like within the RAID group 20 represent stripe blocks, and the size of each stripe block (hereinafter referred to as "stripe size") within a single RAID group 20 is the same. The stripe size can be, for example, 64 KB, 256 KB, or 512 KB. Further, the number such as "1" assigned to each stripe block is referred to as a "stripe block number".

Among the stripe blocks in FIG. 3, the stripe blocks denoted as "P" are for storing redundant data, and these blocks are called "parity stripes". On the other hand, the stripe blocks having numbers (0, 1 and the like) assigned thereto are stripe blocks storing data (data that is not redundant data) written from the superior device such as the host 2. These stripe blocks are called "data stripes".

In the RAID group 20 illustrated in FIG. 3, for example, the stripe block located at the beginning of FMPK #3 (200-3) is the parity stripe 301-3. When the DKC 10 creates the redundant data to be stored in this parity stripe 301-3, redundant data is generated by performing a given operation (such as an exclusive OR (XOR) and the like) to the data stored in the data stripes (stripe blocks 301-0, 301-1, 301-2) located at the beginning of each FMPK 200 (FMPK #0 (200-0) through FMPK #2 (200-2)).

Hereinafter, the set of the parity stripe and the data stripe used for generating the redundant data stored in the relevant parity stripe (such as element 300 within FIG. 3) is called "stripe line". In the case of the storage system 1 according to Embodiment 1, the stripe line is composed based on a rule that each of the stripe blocks belonging to one stripe line exists at the same location (address) of the storage spaces of FMPK 200-0 through 200-3, as in the stripe line 300 illustrated in FIG. 3.

The stripe block number described earlier is a number assigned to the data stripe, which is a unique number within the RAID group. As shown in FIG. 3, the DKC 10 assigns numbers 0, 1 and 2 to the data stripes located at the beginning of each FMPK 200 constituting a RAID group, and manages the data stripes by assigning successive numbers thereafter, such as 3, 4, 5 and so on. Hereinafter, the data stripe having stripe block number n (n is an integral value of 0 or greater) is referred to as "data stripe n".

Further, in the storage system 1, a unique number within the RAID group is assigned to each storage device 200 (200') belonging to the RAID group for management. This unique number is referred to as "position number within RAID group" or "position number". Specifically, when data stripes 0 through k (k>0) are included in the first stripe line within the RAID group, the position number of the storage device 200 (200') storing data stripe m (0≤m≤k) is determined as "m".

Then, in a RAID configuration where one parity stripe exists in a single stripe line, as in RAID5, the position number of the storage device 200 (200') storing the parity stripe is determined to be "k+1". Further, in a RAID configuration where two parity stripes exists in a single stripe line, as in RAID6, the position numbers of the two storage devices 200 (200') storing the parity stripe are determined to be "k+1" and "k+2".

In the case of the RAID group illustrated in FIG. 3, the position numbers of three storage devices 200 (200') storing data stripes 0 through 2 within the first stripe line 300 is determined to be 0, 1 and 2. The position number of the storage device 200 (200') storing the redundant data (parity) within the same stripe line as data stripes 0 through 2 is determined to be 3.

Figure 4:
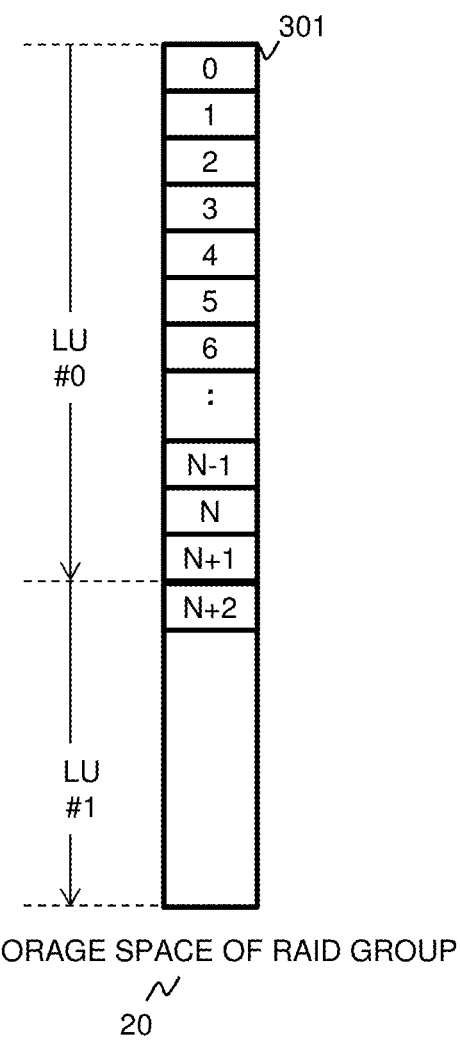
FIG. 4 is a view illustrating the relationship between a storage space and a logical unit (LU) of a RAID group.

Further, the DKC 10 provides one or more storage spaces called logical units (LU) to the superior device, such as the host 2. The relationship between the storage space formed by the RAID group (hereinafter referred to as "storage space of RAID group") and the logical unit will be described with reference to FIG. 4. The storage space of a RAID group is the storage space of the area within the RAID group illustrated in FIG. 3 formed by arranging only data stripes in order from data stripe 0. The DKC 10 can define a continuous area in the storage space of a RAID group as a logical unit. It is possible to define multiple logical units in the storage space of one RAID group, or to define the whole storage space in one RAID group as a single logical unit. FIG. 4 illustrates an example where two logical units (LU #0 and LU #1) are defined in the storage space of the RAID group.

As an example, we will describe the outline of the processing performed when the storage system 1 receives a data write request (write command) from the host 2 to the area corresponding to three stripe blocks from the beginning of LU #0. It is assumed that LU #0 is defined in the RAID group illustrated in FIG. 3. In this case, the DKC 10 divides the data corresponding to three stripe blocks received together with the write command into respective stripe blocks. Hereafter, the three divided and generated data are referred to as "data 0", "data 1" and "data 2". The DKC 10 uses data 0 through data 2 to generate a redundant data (parity), and stores each of the data 0 through data 2 and generated parity to different storage devices 200. When the LU # is defined in the RAID group illustrated in FIG. 3, data 0 through data 2 and the parity are respectively stored in FMPK (200-0) through FMPK (200-3).

If the RAID level of the RAID group in which the LU #0 is defined is RAID5, as shown in FIG. 3, the parity can be generated by calculating the exclusive OR (XOR) of data 0 through data 2. The parity calculation is performed using the parity operation circuit 15 in the DKC 10. However, if the storage device 200 constituting the RAID group has parity generation function such as the parity operation circuit 205, as illustrated in FIG. 2, the party can be generated using the parity generation function in the storage device 200.

In order to manage the RAID group and the logical unit (LU), the DKC 10 has three types of management information in the memory 14, which are a device management table, a RAID group management table (RG management table), and an LU management table. FIG. 5 illustrates an example of a device management table T1000.

The device management table T1000 is a table for managing information related to the respective storage devices 200 (or 200') installed in the storage system 1. The information of the respective storage devices 200 (200') installed in the storage system 1 are stored in the respective rows (in the following description, the rows within a table are referred to as "records") of the device management table T1000. Each record of the device management table T1000 has the following entries: a device # (T1001), a device type (T1002), a belonging RG # (T1003), a device status (T1004), a compression function support (T1005), a parity operation function support (T1006), and a size (T1007).

The DKC 10 assigns a unique identification number to the respective storage devices 200 (or 200') installed in the storage system 1, and this identification number is referred to as a "device number" (or "device #"). The device # of the storage device 200 (200') is stored in the device # (T1001). The device type (T1002) is an entry for storing information related to the type of the storage device 200 (200'). According to the present embodiment, either "FMPK" or "HDD" is stored in the device type (T1002). When "FMPK" is stored in the device type (T1002) of a certain record, it means that the storage device managed by the record is the FMPK 200, and when "HDD" is stored therein, it means that the storage device managed by the record is the HDD 200'. The belonging RG # (T1003) entry will be described later.

The state of the storage device is stored in the device status (T1004). When "normal" is stored in the device status (T1004), it means that the storage device managed by that record is operating normally. When "blockade" is stored in the device status (T1004), it means that the storage device managed by that record is not operating (in a blockade state) due to reasons such as occurrence of failure.

When "failure recovery ongoing (recovery source)" or "failure recovery ongoing (recovery destination)" is stored in the device status (T1004), it means that data recovery processing is performed to the RAID group to which the storage device managed by that record belongs. The details will be described later, but when failure occurs to one storage device, in the data recovery processing, one device in place of the storage device in which failure has occurred is prepared (hereinafter, this device is referred to as "spare device"). Then, the DKC 10 stores "failure recovery ongoing (recovery source)" to the device status (T1004) of the storage device in which failure has occurred. Further, the DKC 10 stores "failure recovery ongoing (recovery destination)" to the device status (T1004) of the storage device set as the spare device. Then, the data stored in the storage device in which failure has occurred is recovered, and the data is written to the spare device, by which data recovery is performed.

The information on whether compression function is supported or not and whether parity operation function is supported or not in the storage device managed by that record is respectively stored in the compression function support (T1005) and the parity operation function support (T1006). When "supported" is stored in the compression function support (T1005), it means that the storage device managed by that record has a compression function, and when "not supported" is stored therein, it means that the storage device managed by that record does not have a compression function. Similarly, either "supported" or "not supported" is stored in the parity operation function support (T1006), and when "supported" is stored, it means that the storage device managed by that record has a parity operation function.

The information stored in the compression function support (T1005) and the parity operation function support (T1006) can be set by the administrator of the storage system 1 by using a management terminal. As another embodiment, the DKC 10 can inquire whether each storage device have the compression function and/or the parity operation function by issuing a command to each storage device to inquire the functions that each storage device has, and the DKC 10 can reflect the result of inquiry to the compression function support (T1005) and the parity operation function support (T1006).

The capacity of the storage device, specifically, the size of the storage space that the storage device 200 (200') provides to the DKC 10, is stored in the size (T1007). The information regarding the size of the storage space is an information that the DKC 10 can acquire from the storage device 200 (200') by issuing a command inquiring the size to the storage device 200 (200'). When the storage device 200 has a compression function, similar to the FMPK 200, the size of the storage space may be greater than the total size of the storage media (such as the FM chips 210) that the storage device 200 has.

FIG. 6 illustrates an example of an RG management table T1100. Similar to the device management table T1000, information regarding the RAID group is stored in the respective records within the RG management table T1100.

The DKC 10 assigns a unique identification number to each RAID group defined in the storage system 1 for management, and this identification number is referred to as a "RAID group number" or "RG #". The RAID group number (RG #) is stored in RG # (T1101). The device #s of the storage devices 200 (200') included in the RAID group are stored in belonging device # (T1102). For example, when the DKC 10 uses the storage devices whose device # are 0, 1, 2, 3 and 4 to create a RAID group (assuming that the RG # thereof is 0), the DKC 10 stores "0, 1, 2, 3, 4" in the field of the belonging device # (T1102) of the record whose RG # (T1101) is 0. Further, the RAID group number to which the respective storage devices belong are stored in the belonging RG # (T1003) of the respective records within the device management table T1000 of FIG. 5.

As mentioned earlier, the storage system 1 maps a position number to the respective storage devices 200 (200') belonging to a RAID group for management. Therefore, the position numbers (T1102') are mapped to the respective FMPKs 200 entered in the belonging device # (T1102). In FIG. 6, the FMPKs 200 whose device # are 8 through 15 belong to the RAID group (whose RG # (T1101) is 1) managed by record T1100-1, and position numbers 0 through 7 are mapped to the respective FMPKs 200.

A RAID configuration (T1103) is an entry storing information related to the configuration of the RAID group, and at least the information on a RAID level showing the data protection method by the RAID technique, a number of data stripes used for generating the redundant data, and a number of generated parity stripes are stored. In the example of FIG. 6, the RAID configuration (T1103) of record T1100-1 is "RAID5 (3D+1P)", which means that the RAID level is 5, and the RAID configuration generates one parity from three data stripes.

The amount (size) of data that can be stored in the RAID group and the stripe size are respectively stored in RG capacity (T1104) and stripe size (T1105). In the present embodiment, the capacity stored in the RG capacity (T1104) is the total size of all data stripes within the RAID group, and it does not include the size of parity. However, as another embodiment, it is possible to have the capacity including the size of parity stored therein.

The state of the RAID group (any one of the states of "normal", "failure recovery ongoing" or "failure recovery unsuccessful") is stored in RG status (T1106). The meaning of the state of the RAID group is similar to the device status (T1004), wherein when "normal" is stored in the RG status (T1106), it means that the RAID group is operating normally. When "failure recovery ongoing" is stored, it means that the recovery processing of the RAID group is performed, and when "failure recovery unsuccessful" is stored, it means that the RAID group is in a blocked state.

Information of "performed" or "not performed" is stored in compression (T1107) and parity operation (T1108), respectively. When "performed" is stored in the compression (T1107), it means that in the RAID group managed by this record, data compression using the compressed function provided to the storage device (FMPK 200) is performed, so that compressed data is stored in the FMPK 200 (in contrast, when "not performed" is stored, it means that the FMPK 200 is not performing data compression). When "performed" is stored in the parity operation (T1108), it means that the parity stored in the RAID group managed by this record is computed using the parity operation function provided to the FMPK 200.

For each RAID group, when all storage devices belonging to the RAID group support the compression function (when the compression function support (T1005) of all the storage devices specified by the belonging device # (T1102) is set to "supported"), the DKC 10 sets "performed" in the compression (T1107). Similarly, when all storage devices belonging to the RAID group support the parity operation function (when the parity operation function support (T1006) of all storage devices specified by the belonging device # (T1102) is set to "supported"), "performed" is set in the parity operation (T1108). As another embodiment, it is possible to have the administrator of the storage system 1 use the management terminal to set "performed" or "not performed" to the compression (T1107) and the parity operation (T1108).

Figures 7, 8:
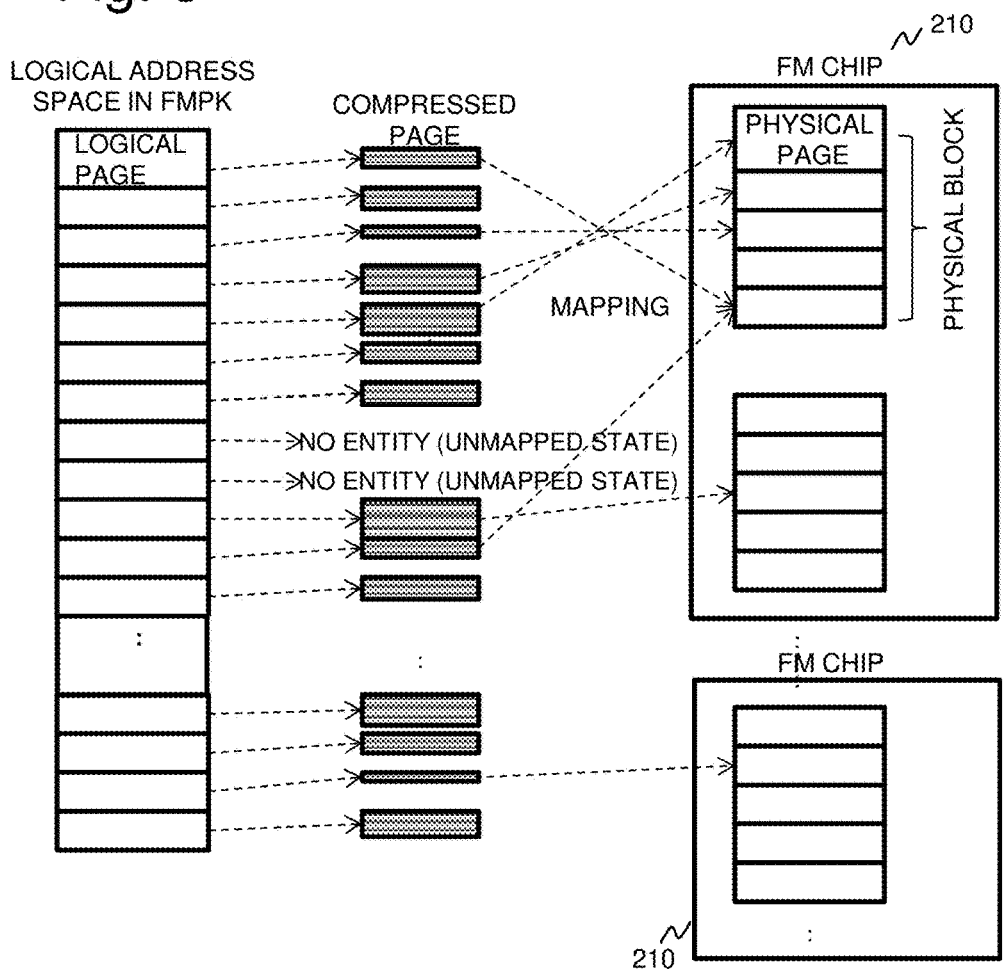
FIG. 7 is a view illustrating a configuration of an LU management table.
FIG. 8 is an explanatory view of a method for managing storage areas in an FMPK.

FIG. 7 illustrates an example of an LU management table T1200. Similar to the device management table T1000, information regarding one LU is stored in each record within the LU management table T1200. Each LU has a unique identification number called a logical unit number (LUN), and the logical unit number of an LU is stored in LU # (T1201).

As mentioned earlier, the DKC 10 defines a continuous area within the RAID group as an LU. An RG # (T1202) of the RAID group in which the LU is defined, an offset address (T1203) within the RAID group in which the LU is defined, and the LU size (T1204) are stored in the LU management table T1200.

Next, the method for managing the storage area within the FMPK 200 will be described with reference to FIG. 8. The FMPK 200 manages the storage space (logical address space) provided to the DKC 10 in units of areas of given sizes called logical pages. A unique number is assigned to each page to specify each logical page. This number is referred to as a "logical page number". The logical page number of the logical page located at the head of logical address space is 0, and successive numbers are assigned to the subsequent logical pages. The size of the logical page can be, for example, 16 sectors (8 KB).

Further, according to the present embodiment, the storage area existing in the FM chip 210 within the FMPK 200 is called "physical page". Physical page is a minimum unit of access (read or write) in a flash memory. Therefore, when the FM controller 201 reads and writes data from/to the FM chip 210, it performs reading and writing in physical page units. Multiple FM chips 210 are installed in the FMPK 200, and multiple physical pages exist in each FM chip 210, so that the FMPK 200 assigns a unique number to each physical page in all FM chips 210. This number is referred to as "physical page number". If the physical page number of the physical page storing the access target data can be specified, the FM chip 210 in which the relevant physical page exists and the location thereof within the FM chip 210 can be uniquely specified.

The size of the physical page and the size of the logical page can be either the same or different. In the present embodiment, the size of the physical page is set to 528×16 bytes (=8 KB+256 bytes). The reason why it is greater by 256 bytes than the size of the logical page (8 KB) is that the respective data has DIF and ECC, described later, added thereto.

As mentioned earlier, the FMPK 200 has a compression function. When the FMPK 200 compresses the data before storing, the FMPK 200 performs compression in logical page units. Hereafter, the data having been generated by compressing the data of one logical page is called "compressed page". The size of the compressed page is a multiple of 520 bytes, so that the minimum size is 520 bytes and the maximum size is (520×16) bytes.

By compression, the size of the compressed page becomes equal to or smaller than the physical page size. Therefore, it becomes possible to store multiple compressed pages in one physical page. Further, it is possible to have one compressed page stored across multiple physical pages. As described in detail later, when a compressed page is stored in the FM chips 210, actually the data having one or multiple 8-byte ECCs assigned thereto is stored. The size of the compressed page described above refers to the size without the ECC assigned thereto.

FIG. 9 illustrates one example of a mapping table T2100 managed by the FMPK 200. Information related to each logical page is stored in each row (record). Entries of a logical page number (T2101), a physical page number (T2102), a size (T2103) and an offset (T2104) are included in the record. The mapping table T2100 is stored in the memory 202.

The logical page number of the logical page managed by the record is stored in the logical page number (T2101). The physical page number of the physical page to which the logical page managed by the record is mapped is stored in the physical page number (T2102).

Since the compressed data (compressed page) is stored in the physical page, information for specifying the area within the physical page storing the compressed page is also managed in the mapping table T2100. The information is the size (T2103) and the offset (T2104). A relative address when assuming that the head address of the physical page is 0 is stored in the offset (T2104). It shows that the compressed page is stored in the area specified by the offset (T2104) and the size (T2103).

For example, in FIG. 9, record T2100-2 (record whose logical page number T2101 is 1000) shows that the logical page whose logical page number 1000 is mapped to the physical page whose physical page number (T2102) is 10, that the data (compressed page) of this logical page is compressed to 2 KB, and that the data is stored in an area having a 2 KB size starting from a 4 KB position from the head of the physical page whose physical page number (T2102) is 10.

Further, it is possible that one compressed page is stored across multiple physical pages. In FIG. 9, record T2100-1 (record whose logical page number T2101 is 1) shows an example where the logical page is mapped to two physical pages. The logical page specified by record T2100-1 (whose logical page number T2101 is 1) is mapped to physical pages whose physical page numbers (T2102) are 500 and 42. Further, it shows that the data of the logical page is compressed to 2 KB (=1 KB+1 KB), and that they are stored in an area having a 1 KB size starting from the 7 KB position from the head of the physical page whose physical page number (T2102) is 500, and in an area having a 1 KB size starting from the 0 KB position from the head of the physical page whose physical page number (T2102) is 42.

When there has not been any access (read or write) to the logical page, mapping to the physical page will not be performed. In FIG. 9, record T2100-0 shows an example of a record where the physical page is not allocated (physical page number T2102 is NULL) in the logical page (T2101 is 2). At the point of time when the FMPK 200 receives an access from the DKC 10 to a logical page for the first time, the physical page is mapped to the logical page.

Next, we will describe the information managed by the FMPK 200 other than the mapping table T2100. FIG. 10 shows the contents of a state management table T2000. The state management table T2000 has entries of a physical capacity T2001, a data compression T2002, a logical capacity T2003, a connection DKC type T2004, a belonging RAID group configuration T2005, a position within RAID group T2006, and a belonging RAID group number (belonging RG #) T2007.

The physical capacity T2001 shows the total storage capacity of the FM chips 210 in the FMPK 200. in the data compression T2002, either "Yes" or "No" is stored, wherein when "Yes" is stored therein, the FMPK 200 stores the write data from the DKC 10 into the FM chips 210 after compression. As for the setting of the data compression T2002, the DKC 10 (or the administrator) sets "Yes" or "No" thereto, for example, when the DKC 10 defines a RAID group using the FMPK 200.

The logical capacity T2003 is a capacity of the address space that the FMPK 200 provides to the DKC 10. When data is stored without being compressed in the FMPK 200, in principle, the value of the physical capacity T2001 and the value of the logical capacity T2003 are the same. When data is stored in the FMPK 200 in a compressed manner, the value of the logical capacity T2003 becomes greater than the physical capacity T2001. When the DKC 10 (or the administrator) sets "Yes" in the data compression T2002, the FMPK 200 stores a temporary value in the logical capacity T2003 (such as a value that is eight times the physical capacity T2001), and provides a storage space having the same size as the temporary value to the DKC 10. As the data is gradually stored in the FM chips 210, when the FMPK 200 determines that data of an amount equal to the logical capacity T2003 cannot be stored, it is possible to perform an operation such as to reduce the size of the logical capacity T2003. In contrast, if the FMPK 200 determines that grater amount of data than the logical capacity T2003 can be stored since the data size has become smaller than predicted by compression, it is possible to perform an operation such as to increase the size of the logical capacity T2003.

The type (model name and the like) of the storage system 1 to which the FMPK 200 is connected is stored in the connection DKC type T2004. At the timing when the FMPK 200 is connected to the storage system 1, the information related to the type of the storage system 1 is provided from the DKC 10 to the FMPK 200. The FMPK 200 stores the provided information to the connection DKC type T2004.

The belonging RAID group configuration T2005, the position within RAID group T2006 and the belonging RG # (T2007) are information related to the RAID group to which the FMPK belongs, and information similar to the information of the RAID configuration T1003, the belonging device # (T1102) and the RG # (T1101) stored in the RG management information T1100 are stored. These information are notified from the DKC 10 to the FMPK 200 when the DKC 10 defines the RAID group using the FMPK 200.

Next, a guarantee code will be described. In the process of storing the write data received from the host 2 to the FMPK 200, the storage controller (DKC) 10 adds a verification information which is information for error detection, and stores the data and this verification information into the drive 121. This verification information is added to each disk block (also referred to as a sector; the size of one disk block (sector) is 512 bytes in general, and also according to the storage system 1 of the present embodiment, the size of one disk block (sector) is set to 512 bytes), which is the minimum access unit for the host 2 to access the logical unit. In the following description, this verification information is referred to as a DIF.

Further, a process to add further verification information to the data is also performed in the FMPK 200. Hereafter, the verification information that the DKC 10 adds to the data is called "DKC-DIF", and the verification information that the FMPK 200 adds to the data in the FMPK 200 is called "PK-DIF". If there is no need to distinguish the two information, they are referred to as "DIF". Also when the FMPK 200 stores data into the FM chips 210, further verification information is added to the data, and this verification information is called "ECC".

Figure 11:
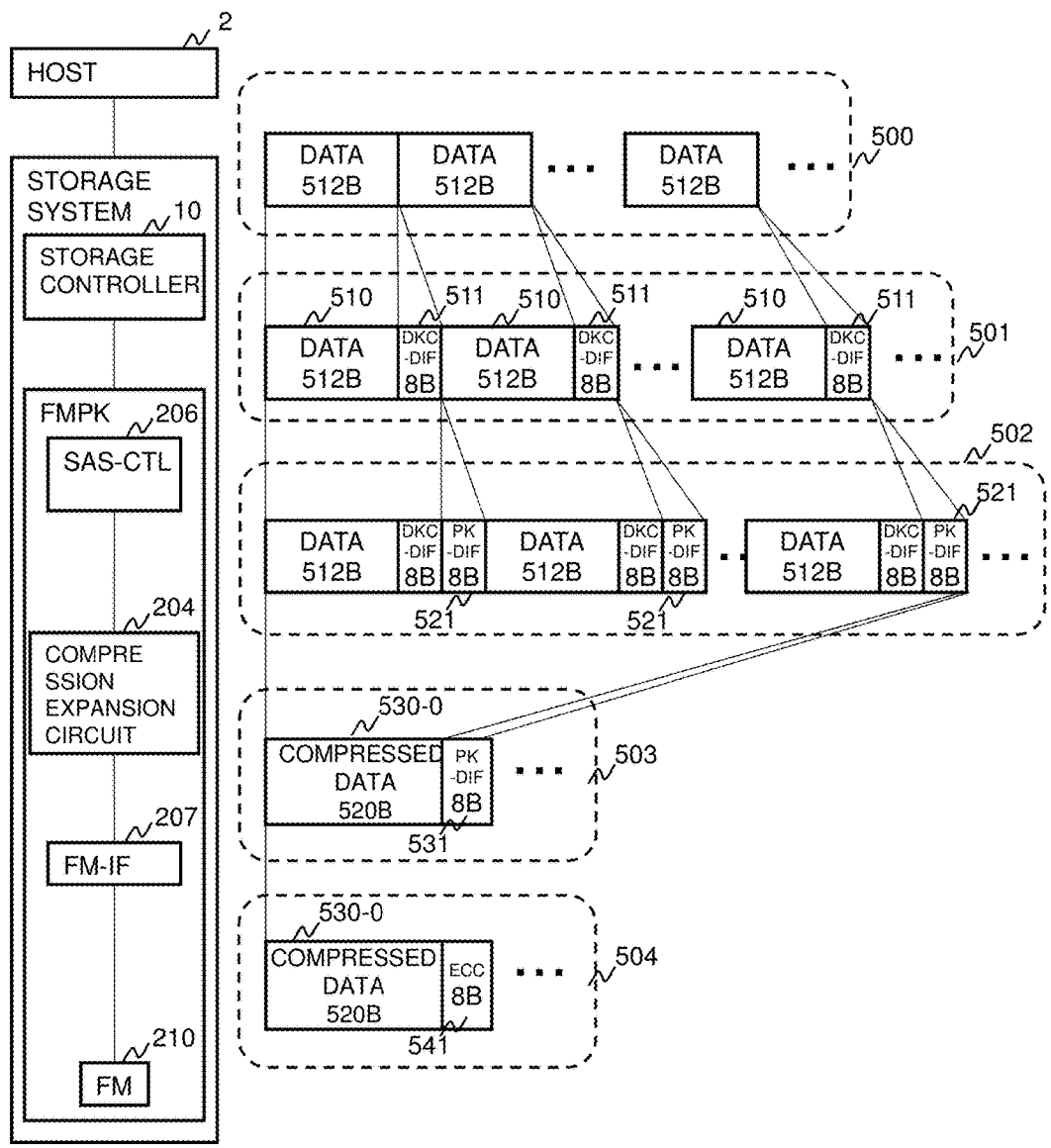
FIG. 11 is a concept view showing the process in which a DIF is added to a write data from the host.

The DKC-DIF and PK-DIF will be described with reference to FIG. 11. FIG. 11 is a concept view showing the process in which the DIF is added to the write data from the host 2. When write data 500 arrives to the storage system 1 from the host 2, the DKC (storage controller) 10 adds DKC-DIF 511 before transmitting the write data to the FMPK 200. Write data 501 shows the state of the write data (state having DKC-DIF 511 added thereto) immediately before it is transmitted to the FMPK 200. The DKC 10 adds a DKC-DIF 511 to each sector (512 bytes), and transmits the write data 501 having DKC-DIF 511 added thereto to the FMPK 200.

Next, we will describe the flow of the data within the FMPK 200. Especially, in the following description, a case where data is compressed in the FMPK 200 will be described. In this case, the data (write data 501) having arrived at the SAS-CTL 206 is passed to the compression expansion circuit 204. Write data 502 shows the format of the data passed from the SAS-CTL 206 to the compression expansion circuit 204. When the SAS-CTL 206 passes the data to the compression expansion circuit 204, it adds a PK-DIF 521 to each sector of write data.

Now, the information included in DKC-DIF and PK-DIF will be described. The size of the DKC-DIF 511 assigned to a one-sector (512-byte) data is 8 bytes. A CRC (Cyclic Redundancy Check), a RAID group number, a sequence number and an address information are included in the DKC-DIF 511.

The CRC is information generated by applying a given arithmetic operation to the data 510. When the SAS-CTL 206 receives a write data 501 having the DKC-DIF 511 added thereto from the DKC 10, the CRC is computed by applying a given arithmetic operation to the data 510. Then, whether the computed CRC and the CRC within the DKC-DIF 511 correspond is determined (hereinafter, this determination is called "CRC check"). When the CRCs do not correspond, it means that the content of the data has been changed due to causes such as failure in the process of the data transmission from the DKC 10 to the SAS-CTL 206. Therefore, when the CRCs do not correspond, an error is returned to the DKC 10, and the writing process of the write data 501 is discontinued.

An address information is the address in the logical storage space of the FMPK 200 to which the data 510 is written (or a portion of the address is included in the address information; for example, if the address exceeds 4 bytes, only the lower four bytes of the address are used as the address information). When the SAS-CTL 206 receives a write data 501 having DKC-DIF 511 added thereto from the DKC 10, it also receives a command instructing to store the write data 501 to the FMPK 200 (so-called a WRITE command). Since the address information of the logical storage space in the FMPK 200 which is the write destination of data 510 is also included in the WRITE command, the SAS-CTL 206 determines whether the address information included in the DIF corresponds to the address information included in the WRITE command. If they do not correspond, the FMPK 200 returns an error to the DKC 10, and discontinues the write processing of the write data 501.

The RAID group number is the number of the RAID group (RG #) to which the FMPK 200 having the data 510 written belongs. The FMPK 200 receives the information of the RAID group number to which it belongs in advance from the DKC 10. Therefore, when the SAS-CTL 206 receives the write data 501 to which the DKC-DIF 511 is added from the DKC 10, it can compare the RAID group number included in the DKC-DIF 511 and the RAID group number received in advance. When the two numbers do not correspond, the FMPK 200 returns an error to the DKC 10, and discontinues the write processing of the write data 501.

A sequence number is a kind of consecutive number. When the DKC 10 writes data corresponding to multiple sectors to the FMPK 200, the DKC-DIF 511 assigned to adjacent data 510 have continuing sequence numbers stored therein. For example, when the DKC 10 writes data corresponding to ten sectors, sequence number 0 is stored in the DKC-DIF 511 assigned to the initial data 510, and sequence number 1 is stored in the DKC-DIF 511 assigned to the next data 510. Therefore, when data of multiple successive sectors are written (or read), the SAS-CTL 206 determines whether the sequence numbers of adjacent sectors are consecutive numbers or not. If consecutive numbers are not assigned, the FMPK 200 returns an error to the DKC 10, and discontinues the write processing of the write data 501.

Similarly in the PK-DIF 521, CRC calculated from the data is included. The CRC included in the PK-DIF 521 is a CRC calculated from the 520-byte data composed of the data 510 and the DKC-DIF 511.

We will now return to the description of FIG. 11. When data having the DKC-DIF 511 and PK-DIF 521 added thereto is passed to the compression expansion circuit 204, the compression expansion circuit 204 performs data compression. As mentioned earlier, the compression is performed to each data corresponding to one logical page. During compression, the DKC-DIF 511 and the PK-DIF 521 added to the data 510 are also compressed. That is, the compression expansion circuit 204 collectively compresses 16 sets of "data 510 and DKC-DIF 511 and PK-DIF 521". Further, the compression expansion circuit 204 generates compressed data so that the size thereof is a multiple of 520 bytes.

When the compressed data 530-0 is generated, the compression expansion circuit 204 adds PK-DIF 531 to the compressed data 530-0. The PK-DIF 531 is assigned to each 520-byte data (compressed data). Similar to the PK-DIF 521, the PK-DIF 531 includes the CRC calculated from the data (compressed data 530-0). Further, the compression expansion circuit 204 computes the CRC from the data 510 and the DKC-DIF 511 before performing compression. Then, it determines whether the computed CRC and the CRC included in the PK-DIF 521 correspond or not. If they do not correspond, it returns an error to the DKC 10, and discontinues the write processing of the write data 501.

The compressed data 530-0 and the PK-DIF 531 thereof generated by the compression expansion circuit 204 is written to the FM chips 210 via the FM-IF 207. When the compressed data 530-0 and the PK-DIF 531 thereof arrive at the FM-IF 207, the FM-IF 207 checks the CRC included in the PK-DIF 531. The check method is similar to the method performed in the compression expansion circuit 204, wherein the CRC is calculated from the compressed data 530-0, and determination is performed on whether the calculated CRC corresponds to the CRC included in the PK-DIF 531 or not. When they do not correspond, an error is returned to the DKC 10, and the write processing of the write data 501 is discontinued.

If an error has not occurred in the CRC check, the FM-IF 207 removes the PK-DIF 531 assigned to the compressed data 530-0. Then, a different error check code is generated from the compressed data 530-0. This error check code is called "ECC". ECC 541 is assigned to each 520-byte compressed data 530-0, similar to the PK-DIF 531. Then, the FM-IF 207 writes the compressed data 530-0 to which the ECC 541 is assigned to the FM chips 210.

In order to read the data from the FM chips 210, a process opposite to the process described above will be performed. The FM-IF 207 reads the compressed data 530-0 having the ECC 541 added thereto from the FM chips 210, and checks the ECC 541 (compares the ECC calculated from the compressed data 530-0 and the ECC 541). Thereafter, the ECC 541 is removed from the compressed data 530-0, a PK-DIF 531 is added thereto, and the compressed data 530-0 to which the PK-DIF 531 is added is passed to the compression expansion circuit 204. In the compression expansion circuit 204, the CRC included in the PK-DIF 531 is checked, and thereafter, the compressed data 530-0 is expanded, to generate (one or more) set(s) of "data 510 and DKC-DIF 511 and PK-DIF 521".

When the generated set of "data 510, DKC-DIF 511 and PK-DIF 521" is transferred to the DKC 10 via the SAS-CTL 206, the SAS-CTL 206 checks the CRC included in the PK-DIF 521, and thereafter, removes the PK-DIF 521 from the set of "data 510 and DKC-DIF 511 and PK-DIF 521", and transfers the data 510 and the DKC-DIF 511 to the DKC 10.

The flow of the data described above illustrates an example of a case where the data is compressed by the compression expansion circuit 204. However, the FMPK 200 can store the data to the FM chips 210 without compressing the same. In that case, the data 510 to which the PK-DIF 521 is added in the SAS-CTL 206 is transmitted to the FM-IF 207 without passing the compression expansion circuit 204. In the FM-IF 207, when the data 510 and the DKC-DIF 511 and PK-DIF 521 thereof arrive, the CRC included in the PK-DIF 521 is checked. The check method is similar to the method described above.

Thereafter, the FM-IF 207 removes the PK-DIF 521 from the data 510 having the PK-DIF 521 added thereto, and generates and adds the ECC. The ECC mentioned here is generated from the 520-byte data composed of the data 510 and the DKC-DIF 511. Then, the data 510 having the ECC added thereto and the DKC-DIF 511 are stored in the FM chips 210.

The information included in the DKC-DIF 511, the PK-DIF 521 and the PK-DIF 531 mentioned above are merely examples, and verification information other than those described above can also be included. Since the DKC-DIF 511 is information added by the DKC 10 to which the FMPK 200 is connected, the format of the DKC-DIF 511 may vary depending on the type (model) of the DKC 10. For example, the length of the CRC and address information may differ, depending on the type of the DKC 10. Further, the order in which the address information, the sequence number and the CRC are arranged within the DKC-DIF 511 may differ according to the type of the DKC 10. The FMPK 200 according to the preferred embodiment of the present invention recognizes the information related to the format of the DKC-DIF of each model (DKC) (such as the locations in which the CRC and address information are stored). Further, by receiving the type (model) information of the DKC from the connected DKC, the stored location of the CRC, the address information, the sequence number and the RAID group number can be recognized.

Next, we will describe the types of the commands supported by the FMPK 200, and the format of the commands. The FMPK 200 receives commands from a superior device, such as the DKC 10, and performs processes (such as reading and writing of data) according to the contents of the instruction information (parameter) contained in the received commands. The FMPK 200 supports read commands instructing reading of data and write commands instructing writing of data, similar to the conventional storage devices such as SSDs and HDDs, but it also supports other commands. Here, we will describe the contents of the commands used in the data recovery processing performed in the present embodiment among the commands supported by the FMPK 200. In the following description, we will assume that the source device issuing the commands to the FMPK 200 is the DKC 10.

[Compressed Read Command]

Figure 12:
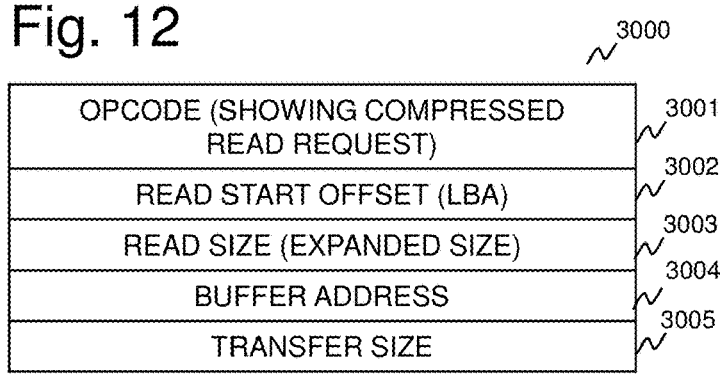
FIG. 12 is a view showing a format of a compressed Read command.

This is a command for instructing that read data should be returned to a command issue source, such as the DKC 10, in a compressed state. The parameters included in the compressed Read command will be described with reference to FIG. 12.

The compressed Read command 3000 includes the following parameters; an operation code (Opcode) 3001, a Read start offset 3002, a Read size 3003, a buffer address 3004, and a transfer size 3005. The operation code (Opcode) 3001 is information included commonly in all commands supported by the FMPK 200 (however the contents of the information included in the operation code 3001 differs according to the commands), and the FMPK 200 can identify the type of the received command by referring to the operation code 3001 of the received command. Of course, information capable of identifying that the command is a compressed Read command is stored in the operation code 3001 included in a compressed Read command 3000.

The Read start offset 3002 and the Read size 3003 are information for specifying the area of the logical address space in the FMPK 200 to which the data to be read by the DKC 10 (read target data) is stored. The head address of the area of the logical address space in the FMPK 200 in which the read target data is stored is designated in the Read start offset 3002, and the size of the read target data is designated in the Read size 3003. In the present embodiment, a logical block address (LBA) is used as the information for specifying the address. However, as another embodiment, the logical page number can be used as the information for specifying the address. Further, the number of sectors is designated in the Read size 3003. However, as another embodiment, other units (such as the logical page number, the number of bytes, and so on) can be designated. Further, the non-compressed data size is designated in the Read size 3003, regardless of whether the data is stored in a compressed manner or not in the FMPK 200.

The buffer address 3004 and the transfer size 3005 are information for specifying the transfer destination area (the beginning address of the area and the area size) of the read target data, and when the DKC 10 issues a compressed Read command 3000 to the FMPK 200, it designates the address of the buffer 131 as the buffer address 3004.

Figure 13:
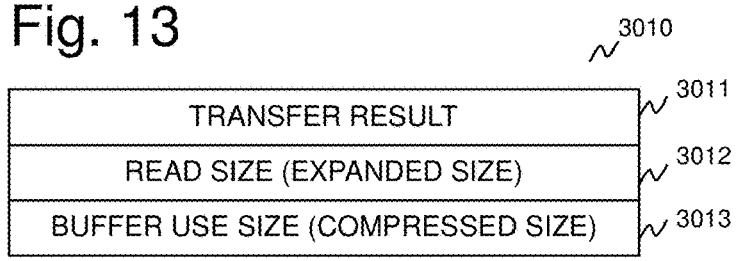
FIG. 13 is a view showing a format of response information to a compressed Read command 3000.

When the FMPK 200 receives a compressed Read command 3000 from the DKC 10, it transfers the read data in a compressed state to the DKC 10 (transfers the data to the area in the buffer 131 of the DKC 10 specified by the buffer address 3004 and the transfer size 3005), and at the same time, returns the response information to the DKC 10. The response information includes information on whether the processing related to the received command has been correctly performed or not, and information related to the size. The format of the response information to the compressed Read command 3000 will be described with reference to FIG. 13.

A transfer result 3011, a Read size 3012 and a buffer use size 3013 are included in the response information to the compressed Read command 3000. A "success" or "error" information is included in the transfer result 3011, and when the transfer result 3011 is a "success", it means that the processing of the compressed Read command 3000 has been performed correctly.

A size (in non-compressed state) of the read target data is stored in the Read size 3012. In principle, the same value as the Read size 3003 of the compressed Read command 3000 is stored therein. The size of the read data in the compressed state transferred to the DKC 10 is stored in the buffer use size 3013.

[Compressed Copy Write Command]

Figure 14:
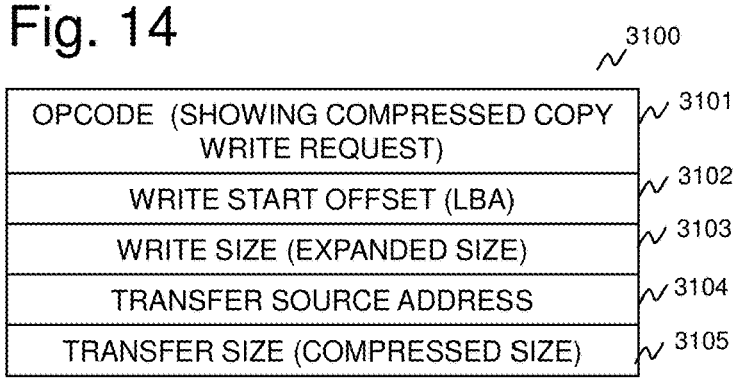
FIG. 14 is a view showing a format of a compressed copy Write command.

This command is used by the DKC 10 for storing the data (in compressed state) read from FMPK 200 using the compressed Read command 3000 described earlier to FMPK 200. The parameters contained in the compressed copy Write command will be described with reference to FIG. 14.

The following parameters are included in a compressed copy Write command 3100: an operation code (Opcode) 3101, a Write start offset 3102, a Write size 3103, a transfer source address 3104, and a transfer size 3105. As mentioned earlier in the description of the compressed Read command, the operation code (Opcode) 3101 includes information that the FMPK 200 uses to identify the type of the received command.

The Write start offset 3102 and the Write size 3103 are information for specifying the write destination area of the write target data, and a head address of the logical address space (provided by the FMPK 200) being the write destination of the write target data is designated in the Write start offset 3102, and a size of the write target data is designated in the Write size 3103. Further, when the compressed copy Write command 3100 is issued, the compressed data from the DKC 10 is transmitted to the FMPK 200, but in that case, the area (area in the logical address space) storing the write data in a non-compressed state is designated as the Write start offset 3102 and the Write size 3103.

The transfer source address 3104 and the transfer size 3105 are information for specifying the area storing the write target data in a compressed state to be transferred to the FMPK 200. Normally, when the DKC 10 issues a compressed copy Write command 3100 to the FMPK 200, the write target data is stored in the buffer 131. Therefore, the head address of the area in the buffer 131 in which the write target data in compressed state is stored and the size of the write target data in the compressed state are respectively designated in the transfer source address 3104 and the transfer size 3105.

Figure 16:
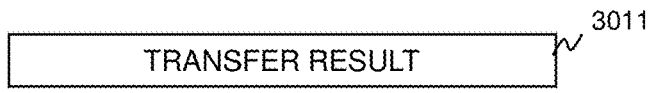
FIG. 16 is a view showing a format of response information to a compressed copy Write command.

As shown in FIG. 16, only the transfer result 3011 is included in the response information to the compressed copy Write command 3100. The transfer result 3011 is the same as the transfer result 3011 included in the response information to the compressed Read command 3000. That is, "success" or "error" information is included therein. When the transfer result 3011 is a "success", it means that the process related to the compressed copy Write command 3100 has been performed correctly.

[Compressed Parity Operation Write Command]

Figure 15:
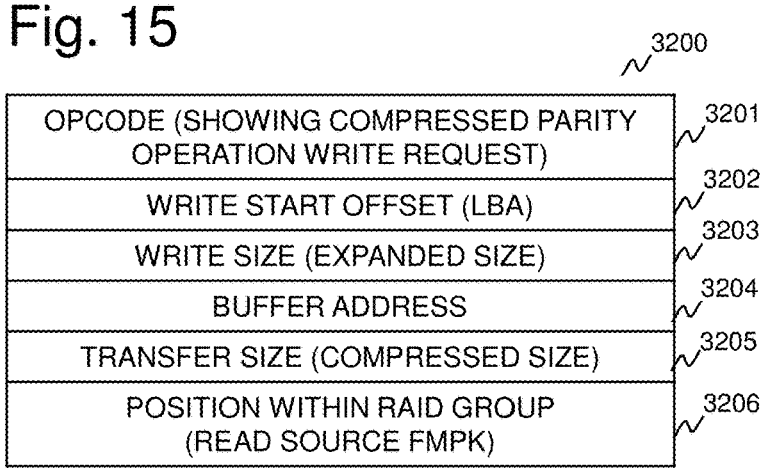
FIG. 15 is a view showing a format of a compressed parity operation Write command.

This command is used for the DKC 10 to transmit the data (in compressed state) read from FMPK 200 using the compressed Read command 3000 described earlier to FMPK 200, and to instruct the FMPK 200 to calculate the redundant data (parity) using the transmitted data. In the following description, the data transmitted to the FMPK 200 together with the compressed parity operation Write command (data in compressed state read from the FMPK 200) is referred to as "write target data". The parameters included in the compressed parity operation Write command will be described with reference to FIG. 15.

The following parameters are included in the compressed parity operation Write command 3200: an operation code (Opcode) 3201, a Write start offset 3202, a Write size 3203, a buffer address 3204, a transfer size 3205, and a position within RAID group 3206.

In the operation code (Opcode) 3201, information for identifying by the FMPK200 the type of the received command is included.

The Write start offset 3202 and the Write size 3203 are information for specifying the storage destination of the data generated through parity operation (hereinafter, this is called parity operation result), wherein the head address of the logical address space (provided by the FMPK 200) being the write destination of the parity operation result is designated in the Write start offset 3202, and the size of the parity operation result is designated in the Write size 3203. Similar to the compressed copy Write command 3100, the area (area in the logical space) storing the parity operation result in the non-compressed state is designated in the Write start offset 3202 and the Write size 3203.

The buffer address 3204 and the transfer size 3205 are similar to the transfer source address 3104 and the transfer size 3105 in the compressed copy Write command. In other words, this information is for specifying the area storing the write target data. Normally, when the DKC 10 issues a compressed parity operation Write command 3200 to the FMPK 200, the write target data is stored in the buffer 131. Therefore, the head address of the area in the buffer 131 storing the write target data and the size (size in compressed state) of the write target data are designated in the buffer address 3204 and the transfer size 3205.

In the position within RAID group 3206, a position number of the FMPK 200 to which the write target data (in compressed state) has been originally stored is stored. This will be described taking the RAID group 20 illustrated in FIG. 3 as an example. When transmitting the data in the compressed state read from the FMPK #0 (position number 0) to the FMPK #3 by issuing a compressed parity operation Write command, the DKC 10 creates a compressed parity operation Write command storing, in the position within the RAID group 3206, the position number (that is, 0) of the FMPK #0 in which the compressed-state data was stored, and issues the created command to the FMPK #3.

The response information to the compressed parity operation Write command 3200 is the same as the response information to the compressed copy Write command 3100. That is, as shown in FIG. 16, only the transfer result 3011 is included.

In addition to the compressed Read command, the compressed copy Write command and the compressed parity operation Write command described earlier, the FMPK 200 also provides a command for setting information to the state management table T2000 (hereinafter, this is called an "information setting command"), and a failure section diagnosis command in the FMPK 200. The command for setting information to the state management table T2000 is simply for transmitting information to be set to the state management table T2000, such as the belonging RAID group configuration (T2500) and the like, so the details thereof are omitted. The failure section diagnosis command in the FMPK 200 is a command issued from the DKC 10 to the FMPK 200 where failure has occurred. The FMPK 200 having received this command returns to the command issue source (DKC 10) a list of logical pages that the DKC 10 cannot access (cannot read or write) due to occurrence of failure among the storage address space that the FMPK 200 provides to the DKC 10.

Next, we will describe a data recovery processing performed in the storage system 1 when failure has occurred to the FMPK 200. In the following description, a case where failure has occurred to the FMPK 200 whose device # is 1 belonging to the RAID group whose RAID group number is 0 will be described as an example.

Figure 17:
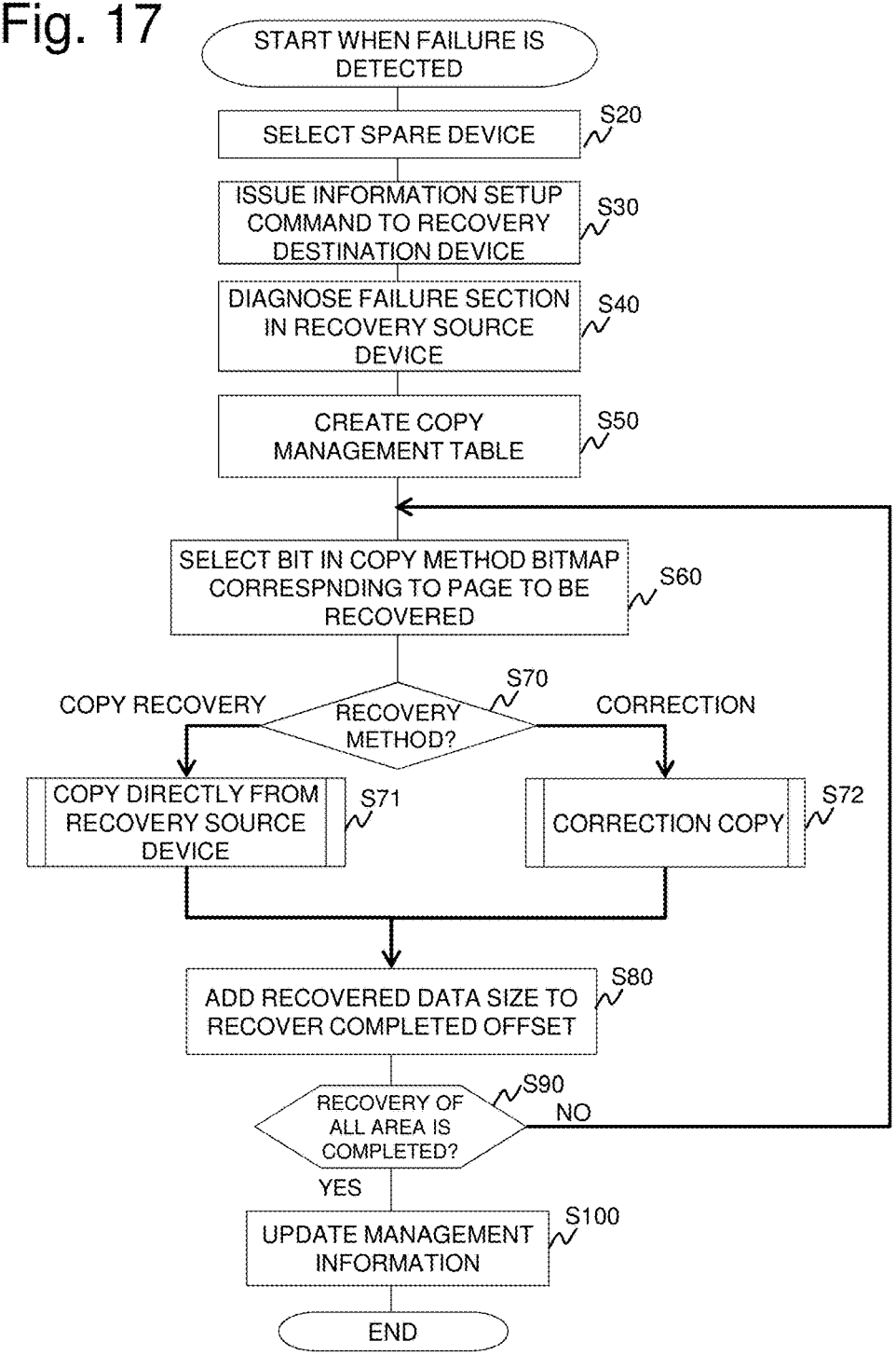
FIG. 17 is a flowchart showing the overall flow of data recovery processing.

FIG. 17 is a flowchart showing the overall flow of the data recovery processing executed by the DKC 10. The DKC 10 starts the data recovery processing of FIG. 17 if access failed (error was returned) when it accessed (reads or writes) the FMPK 200. The memory 14 in the storage system 1 stores a program (data recovery program) for executing the data recovery processing, and the data recovery processing is performed by the processor 11 carrying out the data recovery program.

At first in the data recovery processing, a spare device is selected. The processor 11 refers to the device management table T1000, and selects one FMPK 200 whose belonging RG # (T1003) is "unallocated (spare)" (S20). Hereinafter, the selected FMPK 200 is referred to as a "recovery destination device" or "spare device". Upon selecting a recovery destination device, the FMPK 200 equivalent to the FMPK 200 where failure has occurred (hereinafter, this FMPK 200 is referred to as a "recovery source device") is selected. Specifically, the FMPK 200 having the same compression function support T1005, parity operation function support T1006 and size T1007 is selected.

However, if the compression function support T1005 or the parity operation function support T1006 is "supported" in the recovery source device but there is no spare device where the compression function support T1005 or the parity operation function support T1006 is "supported", the FMPK 200 having the compression function support T1005 or the parity operation function support T1006 set to "not supported" is selected as the spare device. However, in that case, the data recovery processing using the compression function and the parity operation function of the FMPK 200 cannot be performed, so that data recovery processing using the storage controller will be performed, which is done in the conventional storage subsystems.

Moreover, as for the record of the recovery destination device within the device management table T1000, the same number as the RAID group number to which the FMPK 200 where failure has occurred belongs is stored in the belonging RG # (T1003), and "failure recovery ongoing (recovery destination)" is stored in the device status T1004. Further, "failure recovery ongoing (recovery source)" is stored in the device status T1004 of the record regarding the FMPK 200 where failure has occurred. When the FMPK 200 whose device # is 4 (hereinafter, the FMPK 200 whose device # is x (x is an integral value) is denoted as "FMPK #x") is selected as the recovery destination device, the device management table T1000 will be in a state as shown in FIG. 5.

In the data recovery processing according to the present embodiment, one of the following two main methods is used to recover the data of the recovery source device. The first method is a method for reading data from the recovery source device and writing (copying) the same to the recovery destination device. When failure occurs to the recovery source device, in many cases, not all the storage areas will be in a state where access is not possible. Therefore, areas that can be accessed (read) from the DKC 10 may exist in the storage space of the recovery source device. In that case, as for the area that can be read from the DKC 10 out of the storage spaces of the recovery source device, data recovery is performed by reading the data from the readable areas and copying the same to the recovery destination device. This method is hereinafter referred to as "copy recovery". However, this method cannot be used for areas that cannot be accessed (unreadable) from the DKC 10.

The second method is a method for regenerating the data having been stored in the recovery source device by reading the data from the respective devices in the RAID group to which the recovery source device belongs, and using the read data to perform given arithmetic operations. This method is hereinafter referred to as "correction" or "correction copy". The operation taught in Patent Literature 1 can be performed, for example, as the method for regenerating data. When performing correction, three methods can be adopted according to the storage system 1 of the present embodiment, but these three methods will be described later.

In S30, the processor 11 sets a belonging RAID group configuration (T2005), a position within the RAID group (T2006) and a data compression (T2002) to the state management table T2000 in the recovery destination device, by transmitting the information setting command to the recovery destination device. The same information as the RAID configuration of the RAID group to which the recovery destination device belongs (the information stored in T1103 of the RG management table T1100) is set in the belonging RAID group configuration (T2005). The position within the RAID group of the FMPK 200 to which failure has occurred (information stored in T1102 of the RG management table T1100) is set in the position within RAID group (T2006). Further, the same information as the FMPK 200 to which failure has occurred is set in the data compression (T2002). That is, when data compression has been performed in the FMPK 200 (the RAID group to which the FMPK belongs) where failure has occurred, "Yes" is stored in the data compression (T2002). When data compression has not been performed in the FMPK 200 where failure has occurred, "No" is set in the data compression (T2002).

In S40, the processor 11 issues the failure section diagnosis command to the recovery source device. The recovery source device having received this command returns the diagnosis result to the processor 11. As mentioned earlier, a list of logical pages that cannot be accessed is contained in the diagnosis result.

In S50, the processor 11 creates a copy management table. The copy management table is a table having gathered the information that the processor 11 should recognize when performing the data recovery processing. The contents of the information managed by the copy management table T1500 will be described with reference to FIG. 18. The copy management table T1500 includes the following entries: a failure RG # (T1501), a recovery source device (T1502), a recovery destination device (T1503), a correction method (T1504), a recovery device capacity (T1505), a copy method bitmap (T1506), and a recovery completed offset (T1507).

The RG # of the RAID group which is the target of recovery by the data recovery processing is stored in the failure RG # (T1501). The device # of the recovery source device and the device # of the recovery destination device are respectively stored in the recovery source device (T1502) and the recovery destination device (T1503). The information regarding the correction method executed in the data recovery processing is stored in the correction method (T1504). The storage system 1 of the present embodiment can select the following three correction methods.

The first method (hereinafter referred to as "method 1") is the same as the correction method executed in the conventional storage subsystem. Specifically, the DKC 10 reads data from normal FMPKs 200 other than the recovery source FMPK 200 within the RAID group, and based on the read data, the data having been stored in the recovery source device is regenerated using the parity operation circuit 15 within the DKC 10. Then, the DKC 10 writes the regenerated data to the recovery destination.

The second method (hereinafter referred to as "method 2") is a method that can be adopted when the recovery destination FMPK 200 has a parity operation function, which is also taught in Patent Literature 1. Specifically, the DKC 10 reads data from the normal FMPKs 200 other than the recovery source FMPK 200 within the RAID group, and transmits the read data to the recovery destination FMPK 200. In the recovery destination FMPK 200, data is regenerated by computing the parity from the data transmitted from the DKC 200 using its own parity operation function (parity operation circuit 205). Since methods 1 and 2 are known methods, descriptions thereof are omitted in the present embodiment.

The third method (hereinafter referred to as "method 3") is a method that can be adopted when the recovery destination FMPK 200 has a parity operation function and a compression function. In the following description, it is assumed that data recovery is performed by method 3. The specific contents of method 3 will be described in the process of describing the flow of the processes of FIG. 17 and thereafter.

We will return to the description of the copy management table T1500. One of "method 1", "method 2" or "method 3" described earlier is stored in the correction method (T1504). Whether to store "method 1", "method 2" or "method 3" is determined by whether the FMPK 200 belonging to the RAID group being the data recovery target has a parity operation function and a data compression function. If the FMPK 200 is equipped with both the parity operation function and the data compression function, the processor 11 sets "method 3" in the correction method (T1504). If the FMPK 200 has the parity operation function but does not have the data compression function, the processor 11 sets "method 2" in the correction method (T1504). If the FMPK 200 has neither the parity operation function nor the data compression function, the processor 11 sets "method 1" in the correction method (T1504).

Information related to the data executing the data recovery processing is stored in the copy method bitmap (T1506). As mentioned earlier, when failure occurs to the FMPK 200, it may be possible that not all the logical pages within the FMPK 200 are in inaccessible (specifically, unreadable) state. Therefore, in the storage system 1 according to the preferred embodiment of the invention, correction is performed only for the logical pages that cannot be accessed by the DKC 10 in the recovery source FMPK 200 based on the result of diagnosis in S40, and as for the accessible logical pages, data recovery through copy recovery is performed.

If the size of the logical address space of the recovery source FMPK 200 corresponds to n logical pages, the DKC 10 prepares a bitmap having an n bit size as the copy method bitmap (T1506). Then, the bit at the k-th bit (1≤k≤n) in the copy method bitmap (T1506) shows whether correction should be performed or not for the k-th logical page of the logical address space of the recovery source FMPK 200. As a result of the diagnosis in S40, if the k-th logical page in the logical address space of the recovery source FMPK 200 is not accessible, 1 is stored in the k-th bit of the copy method bitmap (T1506) (in other words, data recovery by correction is performed for the k-th logical page). If the k-th logical page is accessible, 0 is stored in the k-th bit in the copy method bitmap (T1506) (in other words, copy recovery is performed to the k-th logical page). In S70, the processor 11 determines the process to be performed next based on the contents of this bitmap.

The address of the logical address space where data recovery has been completed is stored in the recovery completed offset (T1507). In the present embodiment, a logical page number is used as the address to be stored in the recovery completed offset (T1507). However, other address information (such as LBA) can also be used.

In the present embodiment, data recovery is performed sequentially from the beginning address in the logical space of the recovery source device (the logical page whose logical page number is 0). Therefore, in S50, the processor 11 stores 0 as the initial value to the recovery completed offset (T1507). Then, when data recovery corresponding to a single logical page is completed, the processor 11 adds the number of the logical page (1) where data recovery has been completed to the recovery completed offset (T1507).

We will return to the description of S50. In S50, the processor 11 stores information in the failure RG # (T1501), the recovery source device (T1502), the recovery destination device (T1503), the correction method (T1504), the recovery device capacity (T1505), the copy method bitmap (T1506) and the recovery completed offset (T1507) of the copy management table T1500. When failure occurs to the FMPK 200 whose device # is 1 belonging to the RAID group whose RAID group number is 0, the processor 11 stores 0 in the failure RG # (T1501), and 1 (FMPK #1) in the recovery source device (T1502). Further, when FMPK #4 is selected as the recovery destination device, 4 (FMPK #4) is stored in the recovery destination device (T1503).

We will assume a case where the state of the RAID group (RG #0) where failure has occurred is as illustrated in FIG. 6, and the attribute of FMPK #4 of the recovery destination device (especially the compression function support T1005 and the parity operation function support T1006) is as shown in FIG. 5. In this case, the RG #0 executes compression, and performs parity generation using the parity operation function in the FMPK 200. Further, the FMPK #4 supports both the compression function and the parity operation function. Therefore, the processor 11 stores "method 3" as the correction method T1504. Further, the size of the recovery destination device is stored in the recovery device capacity (T1505).

Setting of the copy method bitmap (T1506) is performed based on the diagnosis result in S40 as described above. If the k-th logical page in the logical address space of the recovery source FMPK 200 is not accessible, 1 is stored in the k-th bit of the copy method bitmap (T1506). If the k-th logical page is accessible, 0 is stored in the k-th bit of the copy method bitmap (T1506).

Further in S50, the processor 11 initializes (stores 0 in) the recovery completed offset (T1507).

In S60, the processor 11 selects the (recovery completed offset (T1507)+1)-th bit in the copy method bitmap (T1506), and in S70, it determines the method for recovering the logical page executing the data recovery. If the selected bit is 0 (S70: copy recovery), copy recovery will be performed (S71). If the selected bit is 1 (S70: correction), correction copy will be performed (S72). The contents of the processing of S71 and S72 will be described later.

When the processing of S71 or S72 is completed, the processor 11 performs the processing of S80. In S80, the processor 11 adds the recovered data size to the recovery completed offset (T1507). When recovery is performed in logical page units, 1 is added. In S90, the processor determines whether data recovery has been completed for all area of the recovery source device. The determination of whether data recovery has been completed can be performed by computing a terminal logical page number of the recovery source device based on the recovery device capacity (T1505) (by dividing the recovery device capacity (T1505) by the logical page size), and determining whether the logical page number shown by the recovery completed offset (T1507) has reached the end logical page number of the recovery source device or not.

If data recovery is not completed (S90: No), the processor 11 re-executes the processes of S60 and thereafter. If data recovery is completed (S90: Yes), the processor 11 updates the management information. Specifically, it changes the device status (T1004) to "blockade" regarding the record of the recovery source device in the device management table T1000. Further, the device status (T1004) is changed to "normal" regarding the record of the recovery destination device in the device management table T1000. Moreover, the processor 11 changes the information of the belonging device (T1102) in the RG management table T1100. Specifically, the device # of the recovery source device is deleted and the device # of the recovery destination device is added to the information registered in the belonging device (T1102) (S100).

The above has described the overall flow of the data recovery processing. In principle, an example where data recovery is performed per logical page has been described, but the unit of data recovery is not restricted to logical pages. Data recovery can be performed in units greater than logical pages (such as an integral multiple of logical pages), or can be performed in units smaller than logical pages.

Figure 19:
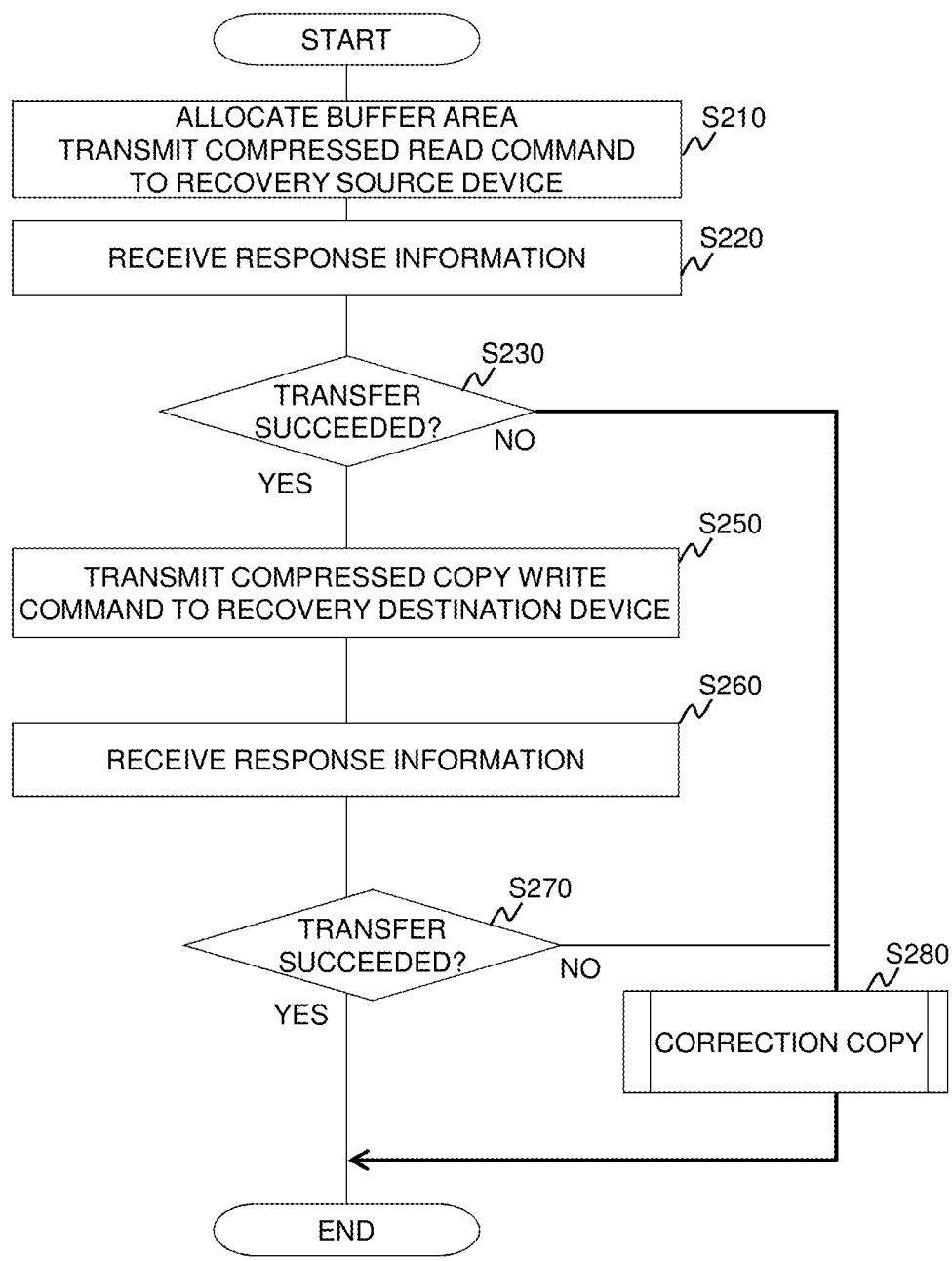

Next, the details of the processing of S71 (that is, the recovery processing performed by copying data from the recovery source device to the recovery destination device) will be described with reference to FIG. 19. In the following, an example is described where data is copied in logical page units. At first, the processor 11 allocates an area corresponding to one logical page as the area for storing read data in the buffer 131. Then, a compressed Read command is issued to the recovery source device (S210). As a parameter of the compressed Read command, a value of the recovery completed offset T1507 (logical page number) converted into LBA is set to the Read start offset 3002. A size corresponding to one logical page is used as the Read size 3003. The information of the area in the buffer 131 allocated earlier is used as the buffer address 3004 and the transfer size 3005.

After issuing the compressed Read command, the processor 11 receives the response information regarding the compressed Read command from the recovery source device (S220). If the transfer result 3011 included in the response information is "error" (S230: No), the processor 11 executes the correction copy (S280) and ends the process. The details of the process performed by the correction copy will be described later.

If the transfer result 3011 included in the response information is "success" (S230: Yes), the writing of data read in S210 and S220 to the recovery destination device is instructed by issuing a compressed copy Write command to the recovery destination device (S250). The same values as the parameters of the compressed Read command issued in S210, which are the Read start offset 3002, the Read size 3003 and the buffer address 3004, are designated as the parameters of the compressed copy Write command issued here, which are the Write start offset 3102, the Write size 3103 and the transfer source address 3104. Further, the value of the buffer use size 3013 included in the response information received in S220 is designated as the transfer size 3105 of the compressed copy Write command.

In S260, the processor 11 receives the response information regarding the compressed copy Write command from the recovery destination device. If the transfer result 3011 included in the response information is "success" (S270: Yes), the process is ended. If the transfer result 3011 included in the response information is "error" (S270: No), the processor 11 executes correction copy (S280) and ends the process.

Figure 20:
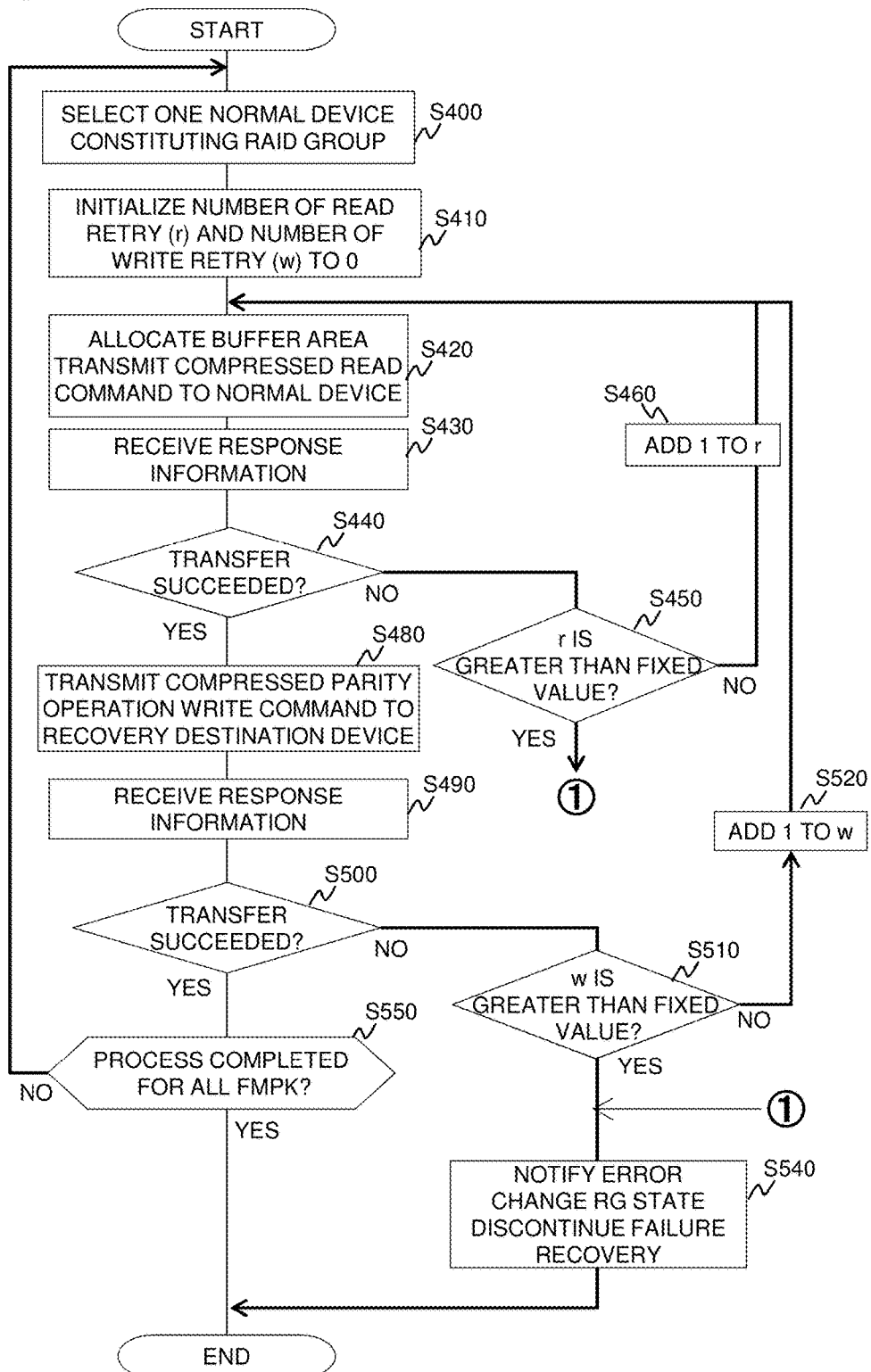
FIG. 20 is a detailed flowchart of a correction copy.

Next, the details of the processing (correction copy) of S72 (or S280) will be described with reference to FIG. 20. As mentioned earlier, according to the storage system 1 of the present embodiment, three methods are selectable as the correction method, but in the following description, only the correction method of method 3 will be described. In other words, it is assumed that the FMPK 200 belonging to the recovery target RAID group has both the parity operation function and the data compression function. Unless otherwise stated, we will describe the correction method regarding the RAID group adopting a RAID configuration where the number of parity stripes per stripe line is 1, as in RAID4 and RAID5. Further, similar to the process of FIG. 19, in the following, we will describe a case where correction copy is performed in logical page units.

At first, the processor 11 selects one normal FMPK 200 out of the FMPKs 200 within the recovery target RAID group that is not subjected to the processes of S410 and thereafter (S400). Next, variables r and w are prepared, and 0 is substituted in both variables for initialization (S410). The variable r is used to record the number of retries performed when data read from the FMPK 200 fails. The variable w is used to record the number of retries performed when data write to the recovery destination device has failed.

In S420, the processor 11 allocates an area corresponding to one logical page in the buffer 131 as an area for storing the read data, and further issues a compressed Read command to the FMPK 200 selected in S400. The contents designated as parameters of the compressed Read command are similar to those designated in S210.

In S430, the processor 11 receives the response information from the FMPK 200 having issued the compressed Read command. If the transfer result 3011 included in the response information is "error" (S440: No), the processor 11 executes the process of S450. If the transfer result 3011 included in the response information is "success" (S440: Yes), the processor 11 executes the process of S480.

If the transfer result 3011 is "error" (S440: No), the processor 11 determines whether the variable r is equal to or greater than a fixed value (S450), and if the variable r is not equal to or greater than a fixed value (S450: No), it adds 1 to r (S460), and re-executes the process of S420. If the variable r is equal to or greater than a fixed value (S450: Yes), the processor 11 executes the process of S540. In S540, it changes the status of the RAID group (RG status T1106) to "failure recovery unsuccessful", and discontinues the data recovery processing. A statement that data recovery has failed is displayed on the management terminal. It is also possible to send a notice to the host 2 that data recovery has failed.

In the determination of S440, if the transfer result 3011 is "success" (S440: Yes), the processor 11 issues a compressed parity operation Write command to the recovery destination device to instruct writing of data read in S420 and S430 to the recovery destination device (S480). The same values as the parameters of the compressed Read command issued in S420, which are the Read start offset 3002, the Read size 3003 and the buffer address 3004, are designated as the parameters of the compressed parity operation Write command issued here, which are the Write start offset 3202, the Write size 3203 and the buffer address 3204. Further, the value of the buffer use size 3013 included in the response information received in S430 is designated as the transfer size 3205. Then, the position number (which can be specified by referring to the position number (T1102') of the RG management table T1100) of the FMPK 200 selected in S400 (that is, the FMPK 200 having issued the compressed Read command in S420) is designated as the position within RAID group 3206.

In S490, the processor 11 receives the response information regarding the compressed parity operation Write command from the recovery destination device. If the transfer result 3011 included in the response information is "success" (S500: Yes), whether the processes of S410 through S500 have been performed regarding all normal FMPKs 200 constituting the RAID group or not is determined (S550), and if processes have been completed for all normal FMPKs 200 (S550: Yes), the process is ended. If an FMPK 200 to which the processes of S410 through S500 have not been performed exists in all normal FMPKs 200 constituting the RAID group (S550: No), the processor 11 executes the processes of S400 and thereafter again.

In the determination of S500, if the transfer result 3011 is "error" (S500: No), the processor 11 determines whether the variable w is equal to or greater than a fixed value (S510), and if the variable w is not equal to or greater than a fixed value (S510: No), it adds 1 to w (S520), and then executes the process of S420 again. If the variable w is equal to or greater than a fixed value (S510: Yes), the processor 11 executes the process of S540. In S540, the state of the RAID group (RG status T1106) is changed to "failure recovery unsuccessful", and the data recovery processing is discontinued.

The processing described above is a data recovery processing of a RAID group whose number of parity stripes per stripe line is 1, so that in S550, whether the processes of S410 through S500 have been performed for all normal FMPKs 200 constituting the RAID group is determined. On the other hand, when data recovery processing is performed to a RAID group where n data stripes and multiple (2 in the case of RAID6) parity stripes exist in a single stripe line, in S550, whether the processes of S410 through S500 have been performed for n FMPKs 200 or not should simply be determined.

The above description describes the flow of the processes performed in the DKC 10 during the data recovery processing. Next, the flow of the processes performed by the FMPK 200 when the DKC 10 issues a command such as a compressed Read command to the FMPK 200 will be described. When the FMPK 200 receives a command from a superior device such as the DKC 10, the processes based on the command is performed by the processor 203 executing a command processing program stored in the memory 202 of the FMPK 202.

Figure 21:
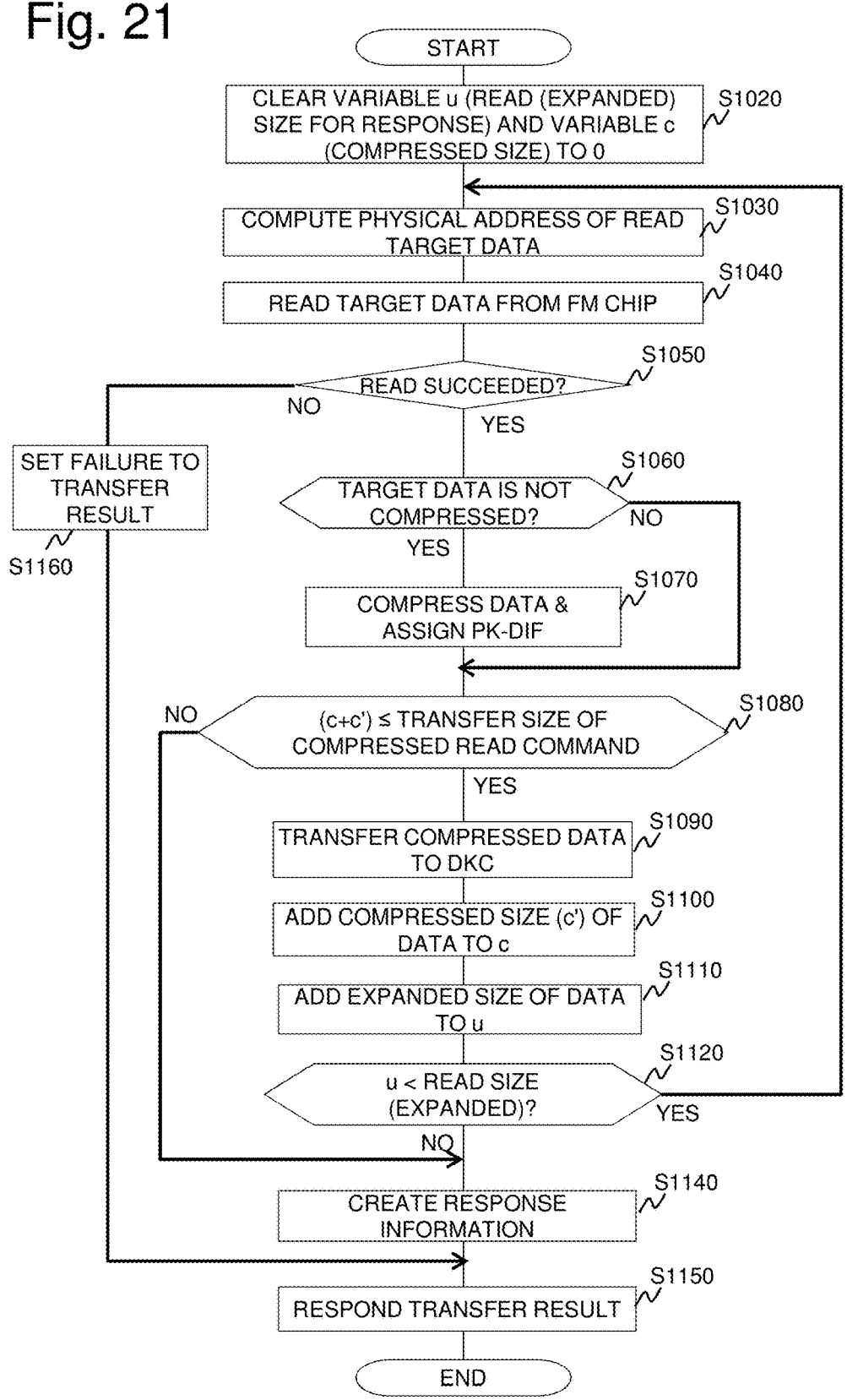
FIG. 21 is a flow of the process performed when a compressed Read command is received.

At first, the flow of the processes performed when the FMPK 200 receives a compressed Read command from the DKC 10 will be described with reference to FIG. 21. When the FMPK 200 receives a compressed Read command from the DKC 10, the processor 203 prepares variables u and c, and initializes (substitutes 0 in) these variables (S1020). Variable u is mainly used for computing the Read size 3012 included in the response information that the FMPK 200 returns to the DKC 10, and variable c is used for computing the buffer use size 3013.

Next, in S1030, the processor 203 computes the address in the FM chip 210 storing the read target data designated by the compressed Read command (more precisely, the physical page number of the physical page and the offset within the physical page). Specifically, it computes the logical page number from the address computed by adding the value of variable u in the Read start offset 3002 included in the compressed Read command parameter. Then, by referring to the mapping table T2100, the physical page number (T2102), the offset within the physical page (T2104) and the size (T2103) of the physical page to which the computed logical page number is mapped is computed. When one logical page is stored across multiple physical pages, multiple sets of the physical page number (T2102), the offset within the physical page (T2104) and the size (T2103) are computed.

Next, the processor 203 reads data from the area (area in the FM chip 210) specified by the physical page number (T2102), the offset within the physical page (T2104) and the size (T2103) obtained in S1030 (S1040). As mentioned earlier, the data stored in the FM chips 210 have an ECC attached to every 520-byte data. In the process of reading data, the FM-IF 207 checks the data using the ECC. When an error has not occurred during the data check (if the ECC attached to the data and the ECC computed from the data correspond), the FM-IF 207 removes the ECC attached to each 520-byte data. Instead, the FM-IF 207 creates a PK-DIF for every 520-byte data, and stores the data having the PK-DIF added thereto in the memory 202. Thereafter, a notice is sent to the processor 203 notifying that the reading has succeeded.

Since the minimum unit of access (read, write) of the FM chips 210 is the physical page, in S1040, reading of data in physical page units is done. Therefore, if one logical page is stored across multiple physical pages, or if a logical page is stored in a compressed state to a physical page and the data of another logical page is also stored in the same physical page, information other than the access target logical page (or the compressed page in which the logical page data is compressed) is read at the same time. In that case, after the data in the physical page is read and stored in the memory 202, the information other than the access target logical page is deleted from the memory 202.

On the other hand, when an error occurs while checking the data (if the ECC attached to the data does not correspond to the ECC computed from the data), the FM-IF 207 notifies the processor 203 that the reading has failed.

When the processor 203 receives a notice from the FM-IF 207 that reading has failed (S1050: No), it creates a response information to be returned to the DKC 10 (S1160). The response information created here is response information having "error" stored as the transfer result 3011. Then, the processor 203 returns the created response information to the DKC 10 (S1150), and ends the process.

On the other hand, when the processor 203 receives a notice from the FM-IF 207 that the reading has succeeded (S1050: Yes), the processes of S1060 and thereafter are performed. In S1060, the processor 203 determines whether the read data is compressed or not. Whether the read data is compressed or not can be determined by checking whether the size (T2103) computed in S1030 is the same as the logical page size or not. If the read data is not compressed (if the size (T2103) is the same as the logical page size), the processor 203 uses the compression expansion circuit 204 to compress the read data. After compressing the data, the compression expansion circuit 204 adds PK-DIF to the compressed data, and stores the same in the memory 202.

When the read data is compressed (S1060: No), the processes of S1080 and thereafter are performed without executing S1070. In the following description, the size of the read data compressed in S1070 (if S1070 is not executed, size of the read data read in S1040) is denoted as c'.

In S1080, the processor 203 determines whether c+c' is equal to or smaller than the transfer size 3005 designated by the parameter of the compressed Read command. If c+c' exceeds the transfer size 3005 (S1080: No), the processor 203 creates a response information storing "success" as the transfer result 3011 (S1140), returns the created response information to the DKC 10 (S1150), and ends the process. If c+c' is equal to or smaller than the transfer size 3005 (S1080: Yes), the processes of S1090 and thereafter are performed.

If S1030 through S1070 have been executed for several times, the total amount of data having been transferred to the buffer 131 in the DKC 10 is stored in variable c. On the other hand, c' denotes the size of the data to be transferred newly to the buffer 131 of the DKC 10. If the data read in S1040 (or data compressed in S1070) is transferred when c+c' exceeds the transfer size 3005, data exceeding the size of the area in the buffer 131 having been allocated by the DKC 10 will be transferred. Therefore, FMPK 200 performs the determination of S1080 so that the amount of data returned to the DKC 10 will not exceed the transfer size 3005 designated by the parameter of the compressed Read command. In principle, when the DKC 10 issues a compressed Read command, it allocates a sufficiently large area (such as the area equal to the expanded read data size) in the buffer 131.

In S1090, the processor 203 transfers the data read in S1040 (if S1070 is executed, the data compressed in S1070) to the buffer 131 in the DKC 10. Although not shown in the drawing, the SAS-CTL 206 checks the PK-DIF attached to the data during the transfer process. When the check result is normal, the SAS-CTL 206 removes the PK-DIF attached to the data, and transfers the data having the PK-DIF removed to the DKC 10. If the check result is not normal, it returns the response information having "error" contained therein to the transfer result 3011, and ends the process.

After S1090 is completed, the processor 203 adds c' to variable c (S1100). Further, in S1110, the processor 203 adds the size of the data (non-compressed size) read in S1040 to variable u. In the process described here, data corresponding to a single logical page is read in the process of S1030 and S1040, so that a size of a single logical page is added to u in S1110. However, as another embodiment, it is possible to read multiple logical pages worth of data, or to read data in units that is unrelated to the logical page in the processes of S1030 and S1040. In that case, in S1110, the size of the read data (non-compressed size) is added to variable u.

In S1120, the processor 203 determines whether variable u is smaller than the Read size 3003 or not. If variable u is smaller than the Read size 3003 (S1120: Yes), the processor 203 performs the processes from S1030 again. If u is not smaller than the Read size 3003 (S1120: No), the processor 203 creates a response information (S1140). The response information created here has "success" stored as the transfer result 3011, the value of variable u stored as the Read size 3012, and the value of variable c stored as the buffer use size 3013. Thereafter, the processor 203 returns the response information to the DKC 10, and ends the process.

Next, the flow of the process performed when the FMPK 200 receives a compressed copy Write command from the DKC 10 will be described with reference to FIG. 22. When the FMPK 200 receives a compressed copy Write command from the DKC 10, the processor 203 receives the write data (acquires the write data from the area in the buffer 131 specified by the transfer source address 3104 and the transfer size 3105 which are parameters of the compressed copy Write command). Then, it stores the received write data in the memory 202. Further, the processor 203 expands the write data using the compression expansion circuit 204, and also stores the expanded data in the memory 202 (S1520). As mentioned earlier, the compressed copy Write command is used when the DKC 10 stores the data (in compressed state) read from FMPK 200 using the compressed Read command 3000 to FMPK 200. Therefore, the write target data by the compressed copy Write command arrives at the FMPK 200 in the compressed state. Before storing the compressed state data to the FM chips 210, the processor 203 temporarily expands the data to perform verification of data using the DIF (DKC-DIF) (hereafter, the verification using the DIF is called "DIF check"; the verification of data using the DKC-DIF is called "DKC-DIF check"; and the verification of data using the PK-DIF is called "PK-DIF check").

Next, the processor 203 executes verification (check) of the data using the PK-DIF and the DKC-DIF attached to the expanded data (S1540). In the PK-DIF check, a process is performed to compare the CRC generated from the expanded data and the CRC included in the PK-DIF, and to determine whether they correspond.

In the DKC-DIF check, mainly the following checks are performed.

a) Whether the CRC generated from the expanded data and the CRC within the DKC-DIF attached to the expanded data correspond or not is checked.

b) Whether the Write start offset 3102 included in the parameter of the compressed copy Write command (or the compressed parity operation Write command) and the address information included in the DKC-DIF correspond or not is checked.

c) Whether the belonging RG # (T2007) stored in the state management table T2000 of the FMPK 200 and the RAID group number included in the DKC-DIF are the same or not is checked.

d) If multiple 512-byte data is included in the expanded data, whether the sequence number within the DKC-DIF added to each 512-byte data is a consecutive number or not is checked.

The format of the DKC-DIF may vary depending on the type of the storage system 1 to which the FMPK 200 is connected. That is, the location within the DKC-DIF in which the CRC and the address information is stored may vary depending on the type of the storage system 1. Therefore, the processor 203 specifies the location within the DKC-DIF where the CRC, the address information and the sequence number are stored based on the contents of the connection DKC type T2004 stored in the state management table T2000 in the FMPK 200.

As a result of the process of S1540, if the result of the DIF check is not normal (S1550; No), the processor 203 creates a response information including "error" as the transfer result 3011 (S1590), returns the created response information to the DKC 10 (S1580), and ends the process. If the result of the DIF check is normal (S1550: Yes), the processor 203 refers to the data compression (T2000) in the state management table T2000 to determine whether data compression is supposed to be performed in the FMPK 200 or not (S1560).

If "Yes" is stored in the data compression (T2002) (S1560: Yes), a process to write the compressed data to the FM chips 210 out of the write data (compressed data) and the expanded data stored in the memory 202 is performed (S1561). In S1561, the processor 203 performs the check of the PK-DIF attached to the compressed data, and when the check is completed, deletes the PK-DIF. However, if the result of the PK-DIF check is not normal, similar to S1550 and S1590, it returns a response information where the transfer result 3011 is "error" to the DKC 10, and ends the process. Thereafter, it writes the compressed data to the FM chip 210. When writing data (compressed data) to the FM chip 210, the processor 203 selects an unused physical page (physical page not mapped to any logical page T2101 in the mapping table T2100), and writes the data to the selected physical page. This process is the same as the process performed in the conventional flash memories.

In the process for writing compressed data to the FM chip 210, the FM-IF 207 generates ECC from the compressed data, adds the ECC to the compressed data, and writes the compressed data to which the ECC is added to the FM chip 210. The ECC is generated and added to in each 520-byte data, as mentioned earlier. At the point of time when writing of data to the FM chip 210 is completed, the contents of the mapping table T2100 are updated.

The outline of update of the mapping table T2100 is as follows. The logical page number is calculated based on the Write start offset 3102. Out of the records in the mapping table T2100, the record having a logical page number (T2101) equal to the computed logical page number is the record to be updated. The mapping table T2100 is updated by writing the physical page number to which the compressed data is written, the offset within the physical page and the size of the compressed data to the physical page number (T2102), the offset (T2104) and the size (T2103) of this record.

Thereafter, the processor 203 creates the response information including "success" in the transfer result 3011 (S1570), returns the created response information to the DKC 10 (S1580), and ends the process. Both the expanded data and the compressed data are stored in the memory 202, but both data are deleted when the process is ended.

On the other hand, when "no" is stored in the data compression (T2002) (S1560: No), it means that data compression is not performed in the FMPK 200. Therefore, the expanded data is written to the FM chips 210 (S1562). In S1562, the processor 203 deletes the PK-DIF added to the expanded data, and writes the expanded data to the FM chip 210. In the process of writing the expanded data to the FM chip 210, similar to S1561, the FM-IF 207 generates the ECC from the expanded data, adds the ECC to the expanded data, and writes the expanded data to which the ECC is added to the FM chip 210. Further, similar to S1561, the contents of the mapping table T2100 are updated.

Thereafter, the processor 203 creates a response information including "success" as the transfer result 3011 (S1570), returns the created response information to the DKC 10 (S1580), and ends the process. Further, both the expanded data and the compressed data stored in the memory 202 are deleted when the process is ended.

When performing the process to write the compressed data to the FM chip 210 in the above process (S1561), the compressed data (compressed page) is generally smaller than the physical page size. Therefore, the storage area can be used efficiently by writing multiple compressed data in a single physical page. However, since the minimum write unit of the FM chip 210 is a physical page, if the process to write a compressed data to a physical page is performed every time a compressed copy Write command is received, even when an unused area remains in the physical page, the data cannot be written.

Therefore, as another embodiment, instead of writing compressed data to an FM chip (physical page) in S1561 every time a compressed copy Write command is received, it may be possible to return a response information to the DKC 10 at the point of time when an ECC is added to the compressed data in the memory 202 (S1570, S1580), and to end the process. Then, at the point of time when compressed data equal to (or greater than) the physical page size is accumulated as a result of receiving the compressed copy Write command for multiple times, the compressed data is stored in the physical page. Thereby, the storage area of the FM chips 210 can be used efficiently. In that case, when power supply to the FMPK 200 is discontinued due to power failure or the like, the data accumulated in the memory 202 may be lost. Therefore, it is preferable the FMPK 200 is configured to have a battery etc. in order not to volatilize the contents in the memory 202 when power supply is stopped. In performing the process of S1562 (when writing the expanded data to the FM chip 210), it is possible to write multiple data (data corresponding to a single physical block in a collective manner) to the FM chip 210.

As yet another embodiment, it is possible to transmit write data having an amount as close as possible to the physical page size when the DKC 10 issues a compressed copy Write command to the FMPK 200. Since the DKC 10 recognizes the size of the respective compressed data (since the compressed data size is received from the FMPK 200 as response information at the end of the compressed Read command), when issuing the compressed copy Write command in S250, it can collectively transmit multiple compressed data of an amount possibly equivalent to the physical page size to the FMPK 200. Thus, in S1561, even if the FMPK 200 writes a compressed data to the FM chip (physical page) every time a compressed copy Write command is received, the compressed data can be stored efficiently in the physical page.

Figure 23:
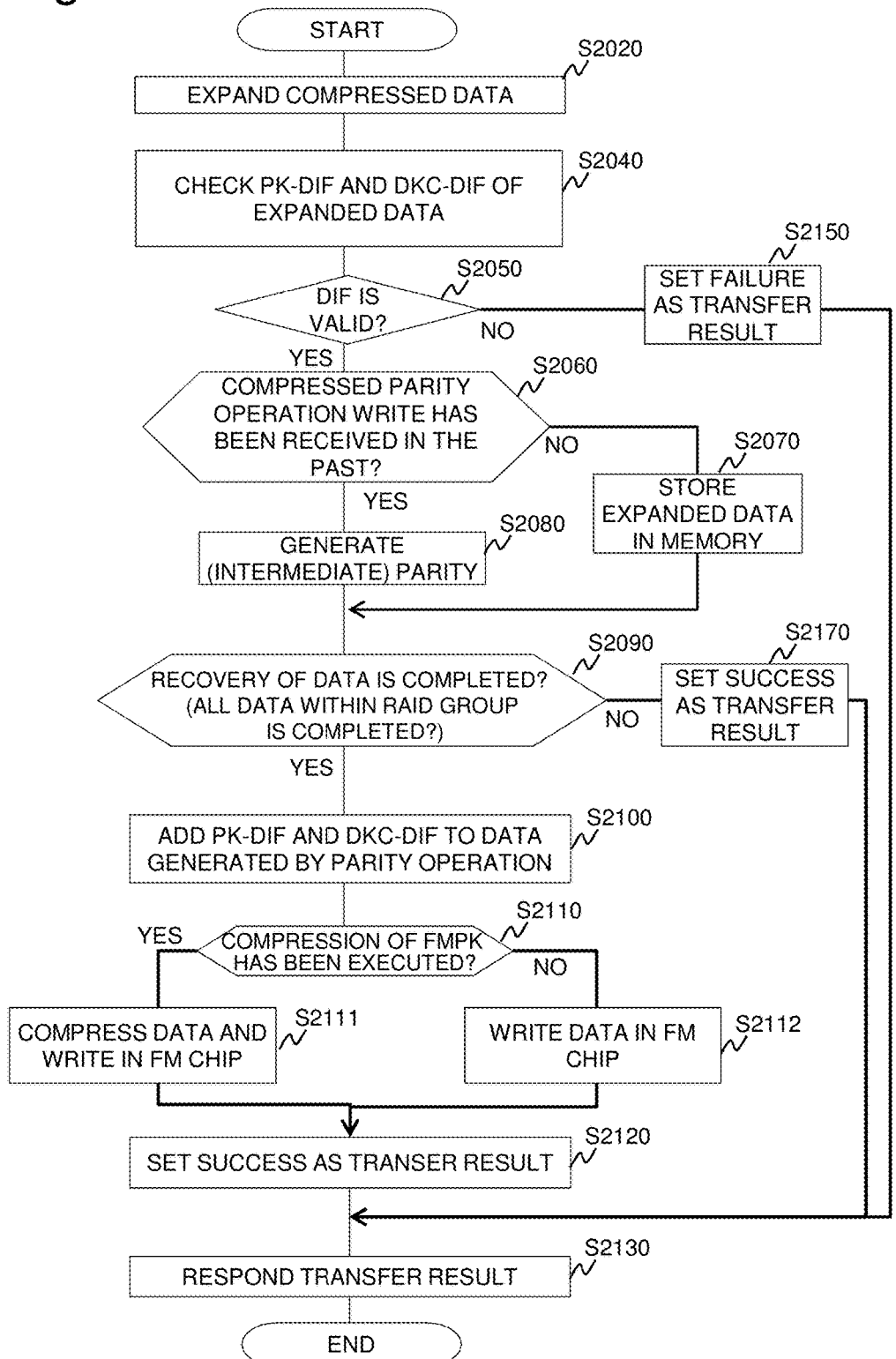
FIG. 23 is a flowchart of the process performed when a compressed parity operation Write command is received.

Next, the flow of the process performed when the FMPK 200 receives a compressed parity operation Write command from the DKC 10 will be described with reference to FIG. 23. In the following description, the data transmitted to the FMPK 200 together with the compressed parity operation Write command (data in compressed state read from a normal FMPK 200) is referred to as "write target data". Further, the area specified by "the Write start offset 3202 and the Write size 3203" which are parameters of the compressed parity operation Write command is referred to as "write target area".

Figure 22:
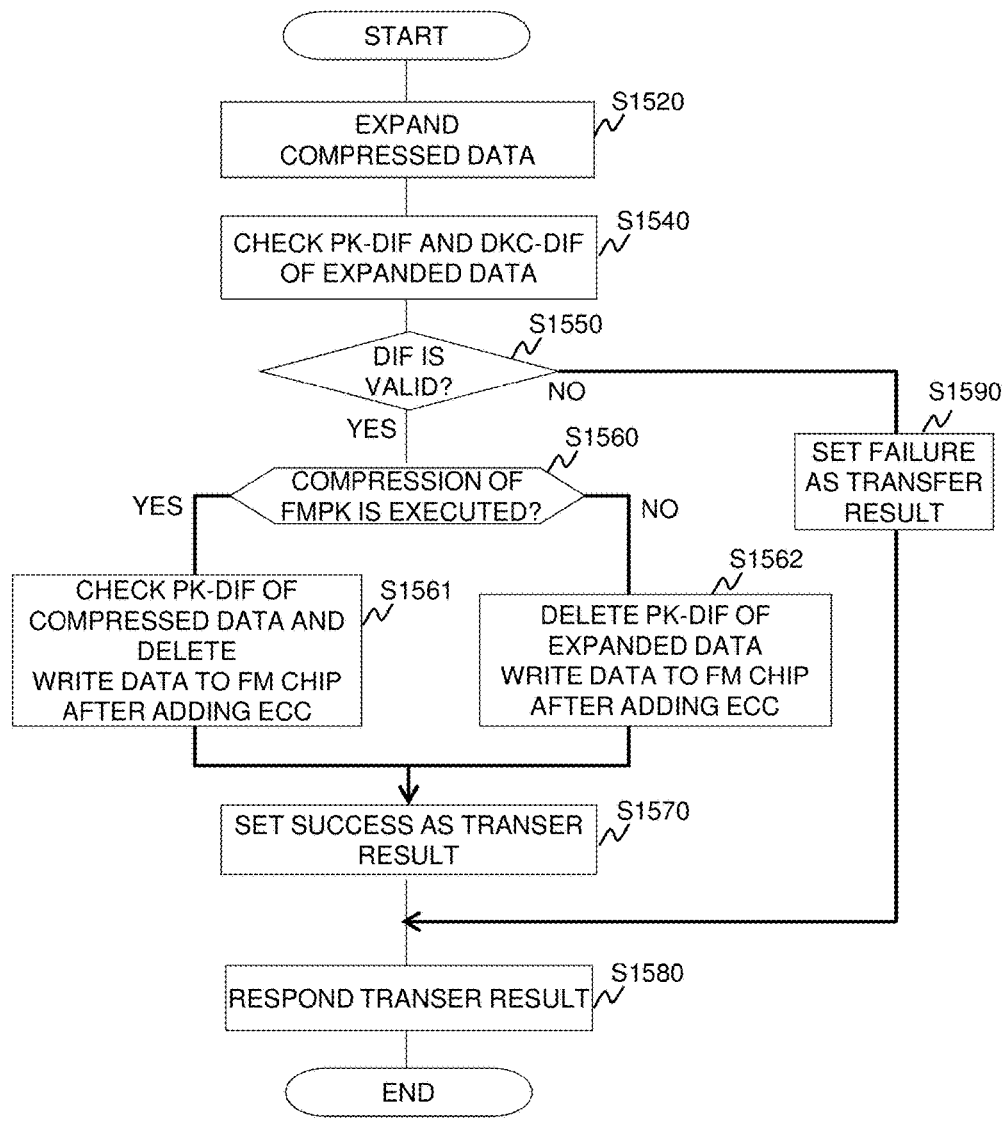
FIG. 22 is a flow of the process performed when a compressed copy Write command is received.

S2020 through S2050 are the same as S1520 through S1551 of FIG. 22. Further, S2150 is the same as S1590. However, in FIG. 22, both the expanded data and data in compressed state are stored in the memory 202 after executing S1520, but in S2020, only the expanded data is stored in the memory 202, and the data in compressed state received from the DKC 10 can be deleted from the memory 202.

After the determination of S2050, if the DIF check result is normal (S2050: Yes), the processes of S2060 and thereafter are performed. In S2060, the processor 203 determines whether a compressed parity operation Write command has been received to the current write target area in the past or not. The method of determination will be described later. If a compressed parity operation Write command has been received for the first time to the current write target area (S2060: No), an area for storing the write target data is allocated in the memory 202, and the data expanded in S2020 is stored in the area of the allocated memory 202 (S2070). Thereafter, the processor 203 performs the processes of S2090 and thereafter.

The processor 203 manages the relationship between the write target area and the area in the memory 202 storing the write target data (or the parity generated from the write target data) by a staging information management table T2500 as shown in FIG. 24. The staging information management table T2500 is a table for managing that the write target data (or the parity generated using the write target data) to the logical page specified by a logical page number T2501 is stored in the area of the memory 202 specified by an address T2502. Further, the number of times the compressed parity operation Write command designating the logical page specified by the logical page number T2501 as the write target area has been received is recorded in a number of times T2503.

In the initial state, an invalid value (NULL) is stored in the address T2502, and 0 is stored in the number of times T2503. When the area for storing the write target data is allocated in the memory 202, the processor 203 stores the allocated address of the memory 202 into the address T2502. Thereafter, 1 is added to the number of times T2503.

Therefore, if the compressed parity operation Write command where the logical page specified by the logical page number T2501 is the write target area has not been received in the past, an invalid value (NULL) is stored in the address T2502 corresponding to the logical page, and 0 is stored in the number of times T2503. In S2060, the processor 203 refers to the value in the number of times T2503 (or the value in the address T2502) and determines whether a compressed parity operation Write command has been received regarding the current write target area in the past. If the value of the number of times T2503 is other than 0, it is determined that the compressed parity operation Write command has been received in the past.

If a compressed parity operation Write command has been received in the past (S2060: Yes), the parity is computed based on the data stored in the memory 202 and the data expanded in S2020 (S2080). In S2080, the processor 203 computes the data stored in the area specified by the address T2502 in the memory 202 and the expanded data generated in S2020 using the parity operation circuit 205. Then, the computed result (hereinafter called "intermediate parity") is stored in the memory 202 specified by the address T2502, and adds 1 to the number of times T2503 (S2080). As recognized by the above description, party generation is performed by using the expanded data. This is because data cannot be regenerated if parity is calculated using compressed data.

The calculation performed by the parity operation circuit 205 in S2080 is an exclusive OR (XOR), for example, when the RAID level of the RAID group to which the FMPK 200 belongs is RAID5. On the other hand, if the RAID level of the RAID group to which the FMPK 200 belongs is RAID6, the exclusive OR is calculated in some cases, or the Reed-Solomon code (Galois field polynomial arithmetic operation) is calculated in other cases. The calculation method is determined depending on which data in which FMPK 200 in the RAID group should be regenerated.

When performing the calculation of the Reed-Solomon code, it is necessary to perform a multiplying operation where a given coefficient is multiplied to the data, as taught in Patent Literature 1. The given coefficient value to be multiplied also depends on the position within RAID group. Therefore, in S2080, the processor 203 determines the data regeneration method (exclusive OR or Reed-Solomon code) and the coefficient used in the multiplying operation based on the belonging RAID group configuration T2005 and the position within RAID group T2006 stored in the state management table T2000 and the position within the RAID group 3206 included in the parameters of the compressed parity operation Write command, and performs parity generation using them.

In S2090, the processor 203 determines whether the recovery of data is completed or not. For example, if the configuration of the RAID group to which the FMPK 200 having received the compressed parity operation Write command belongs is RAID5 (3D+1P) (where the stripe line is composed of four stripe blocks), data can be regenerated by computing the XOR of the data read from three FMPKs 200.

That is, it can be determined that the recovery of data is completed (recovered data is stored in the area of the memory 202 specified by the address T2502) if the compressed parity operation Write command has been received three times and the XOR operation has been performed three times.

Therefore, according to the FMPK 200 of the present embodiment, in S2090, the processor 203 refers to the number of times the compressed parity operation Write command has been received to the write target address stored in the number of times T2503, to determine whether or not the recovery of data has been completed. For example, if the configuration of the RAID group to which the FMPK 200 having received the compressed parity operation Write command belongs is RAID5 (nD+1P) (wherein n is an integer of 1 or greater), it determines whether the compressed parity operation Write command has been received for n times. Further, even if the RAID configuration of the RAID group to which the FMPK 200 belongs stores multiple parity stripes, such as RAID6 (nD+2P), it is possible to determine whether the recovery of data is completed or not, by determining whether the compressed parity operation Write command has been received for n times.

If the recovery of data is not completed (S2090: No), that is, if the compressed parity operation Write command has not been received for a given number of times, the processor 203 creates a response information storing "success" in the transfer result 3011 (S2170), returns the created response information to the DKC 10 (S2130), and ends the process. In this case, to prevent the data stored in the memory 202 in S2070 or S2080 from being lost due to causes such as power failure, it is preferable to store them into the FM chips 210.

When the recovery of data is completed (S2090: Yes), that is, when the compressed parity operation Write command has been received for a given number of times, the processor 203 adds a DKC-DIF to the data (called restored data) stored in the memory 202, and further adds a PK-DIF thereto (S2100).

In S2110, the processor 203 determines whether data compression is supposed to be done in the FMPK 200 or not by referring to the data compression (T2002) of the state management table T2000. This process is similar to S1560.

When "Yes" is stored in the data compression (T2002) (S2110: Yes), since data compression is supposed to be done in the FMPK 200, the data that the DIF is added by the process of S2110 is compressed, and thereafter, the compressed data is written to the FM chip 210 (S2111). After writing data to the FM chip 210, the mapping table T2100 is also updated.

Thereafter, the processor 203 creates a response information storing "success" as the transfer result 3011 (S2120), returns the created response information to the DKC 10 (S2130), and ends the process.

When "No" is stored in the data compression (T2002) (S2110: No), data compression will not be performed in the FMPK 200. Therefore, the data to which the DIF is added in S2110 is written to the FM chip 210 as it is (S2112). After writing data to the FM chip 210, the mapping table T2100 is updated, similar to the process of S2111. Thereafter, the processor 203 creates a response information storing "success" as the transfer result 3011 (S2120), returns the created response information to the DKC 10 (S2130), and ends the process.

In the storage system 1 according to Embodiment 1, when restoring data, data is read in a compressed state from the recovery source storage device (the storage device in which failure has occurred, or the storage device belonging to the same RAID group as the storage device in which failure has occurred), and the data is transmitted to the recovery destination storage device (spare device), so that the transmission time of the data for recovery can be shortened. Further, since correction is performed at the recovery destination storage device, the load applied on the storage controller can be reduced compared to when data correction is performed at the storage controller side. Moreover, since DIF is checked by expanding data at the recovery destination storage device, it becomes possible to detect error caused by data transfer.

Embodiment 2

Next, we will describe the storage system according to Embodiment 2. The configuration of the storage system 1 according to Embodiment 2 is the same as the configuration of the storage system according to Embodiment 1.

The difference between the storage systems of Embodiment 1 and Embodiment 2 is the command issued to the FMPK 200 during the data recovery processing, especially during correction. According to the storage system 1 of Embodiment 1, only one type of command called a compressed parity operation Write command has been issued to the recovery destination device during correction. On the other hand, according to the storage system 1 of Embodiment 2, two types of commands, which are a compressed intermediate parity operation command and a parity commit command, are issued to the recovery destination device during correction. Hereafter, the flow of the process performed during correction performed in the storage system 1 according to Embodiment 2 will be described.

At first, we will describe the two types of commands, which are the compressed intermediate parity operation command and the parity commit command. The compressed intermediate parity operation command is similar to the compressed parity operation Write command, in that the DKC10 uses it to transmit data (in the compressed state) read from FMPK 200 using the compressed Read command 3000 described in Embodiment 1 to FMPK 200 and to instruct the FMPK 200 to compute parity based on the transmitted data and the data stored in the FMPK 200.

However, the FMPK 200 having received the compressed parity operation Write command stores the generated data to the FM chip 210 at the final stage (and also updates the mapping table T2100), but when the compressed intermediate parity operation command is issued to the FMPK 200, the FMPK 200 does not store the generated data into the FM chip 210. The FMPK 200 stores the generated data into the FM chip 210 only when the parity commit command is received.

The command formats of the compressed intermediate parity operation command and the parity commit command are described with reference to FIGS. 25 and 26. The parameters included in the compressed intermediate parity operation command are the same as the parameters in the compressed parity operation Write command, which are the operation code (Opcode) 3201', the Write start offset 3202', the Write size 3203', the buffer address 3204', the transfer size 3205', and the position within RAID group 3206'. Excluding the value of the operation code 3201' (the value of the operation code 3201' of the compressed intermediate parity operation command is, of course, different from the values of the operation codes of other commands, such as the compressed parity operation Write command), the contents of the respective parameters are the same as the parameters included in the compressed parity operation Write command, so that the description thereof is omitted.

FIG. 26 shows a command format of the parity commit command. An operation code 3301, a Write start offset 3302, and a Write size 3303 are included in the parity commit command. The flow of the processes performed in the FMPK 200 having received the parity commit command will be described later. Further, the format of the response information regarding the compressed intermediate parity operation command and the parity commit command is the same as the response information regarding the compressed parity operation Write command and the like, so the description thereof will be omitted.

Figure 27:
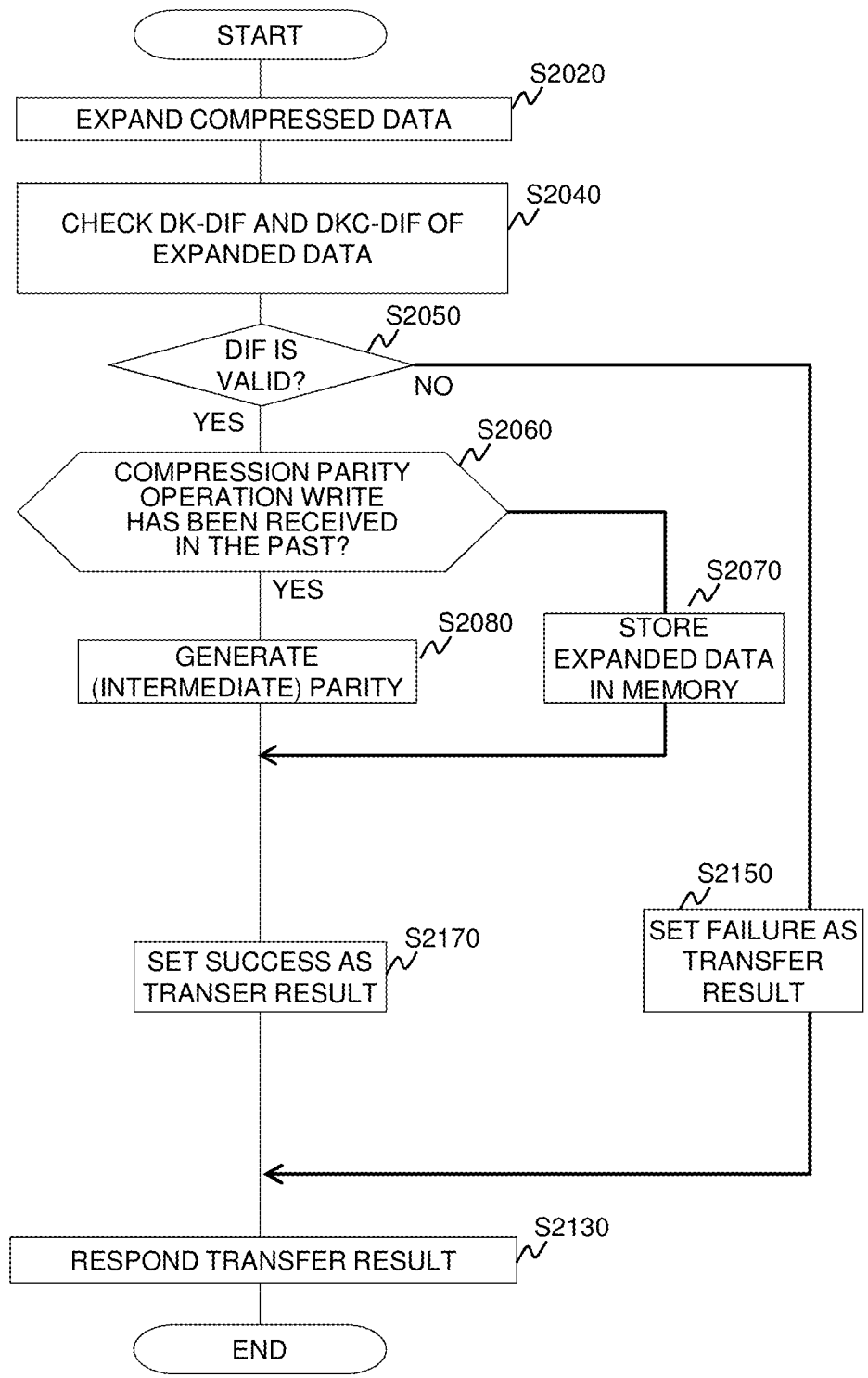
FIG. 27 is a flowchart of the process performed when a compressed intermediate parity operation command is received.

Next, the flow of the processes performed when the FMPK 200 receives a compressed intermediate parity operation command from the DKC 10 will be described with reference to FIG. 27. The processes of S2020 through S2080 are the same as S2020 through S2080 of FIG. 23. That is, processes for generating an intermediate parity and storing the same in the memory 202 are performed.

After the process of S2080 or S2070 is completed, the processor 203 creates a response information storing "success" as the transfer result 3011 (S2170), returns the created response information to the DKC 10 (S2130), and ends the process. In other words, the point that S2090, S2100, S2110, S2111, S2112 and S2120 in FIG. 23 among the process of the compressed parity operation Write command are not performed is the difference between the compressed intermediate parity operation command and the compressed parity operation Write command. The process corresponding to S2090, S2100, S2110, S2111, S2112 and S2120 in FIG. 23 is performed when the FMPK 200 receives the parity commit command.

Figure 28:
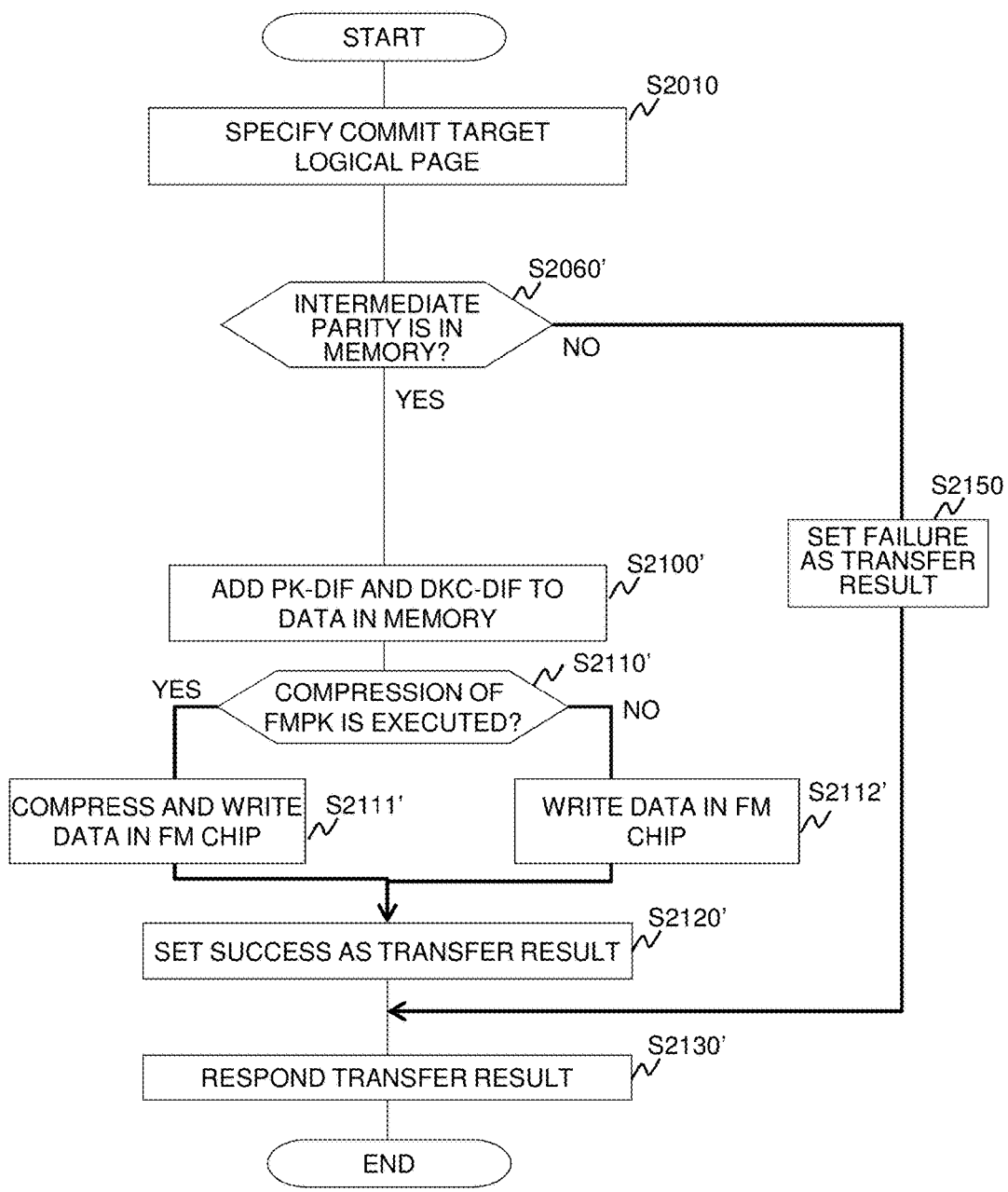
FIG. 28 is a flowchart of the process performed when a parity commit command is received.

Next, the flow of the processing performed when the FMPK 200 receives a parity commit command from the DKC 10 will be described with reference to FIG. 28. At first, based on the Write start offset 3302 and the Write size 3303 included in the command parameters, the processor 203 computes the logical page number of the area (hereinafter called a commit target area) being the processing target by the received parity commit command (S2010).

Next, the processor 203 refers to the staging information management table T2500, and determines whether the data (intermediate parity) corresponding to the commit target area is stored in the memory 202 or not (S2060'). In order to do so, it is simply necessary to determine whether a valid value (value other than NULL) is stored in the address (T2502) of the record whose logical page number (T2501) in the staging information management table T2500 is the same as the logical page number identified in S2010.

When NULL is stored in the address (T2502) (S2060': No), it means that a compressed intermediate parity operation command to the commit target area has not been received in the past (generation of intermediate parity has not been performed). Therefore, the processor 203 creates a response information including "error" as the transfer result 3011 (S2150), returns the created response information to the DKC 10 (S2130), and ends the process.

When a valid value is stored in the address (T2502) (S2060': Yes), a PK-DIF and a DKC-DIF are added to the data (data corresponding to commit target area (intermediate parity)) stored in the memory 202 (S2100'). This is the same process as S2100 of FIG. 23. Hereafter, S2110', S2111', S2112', S2120' and S2130' are the same as S2110 through S2130 in FIG. 23. In other words, the data to which the PK-DIF and the DKC-DIF are added is written (if necessary, after compression) to the FM chip 210, and returns a response information to the DKC 10 that the process has succeeded.

Figure 29:
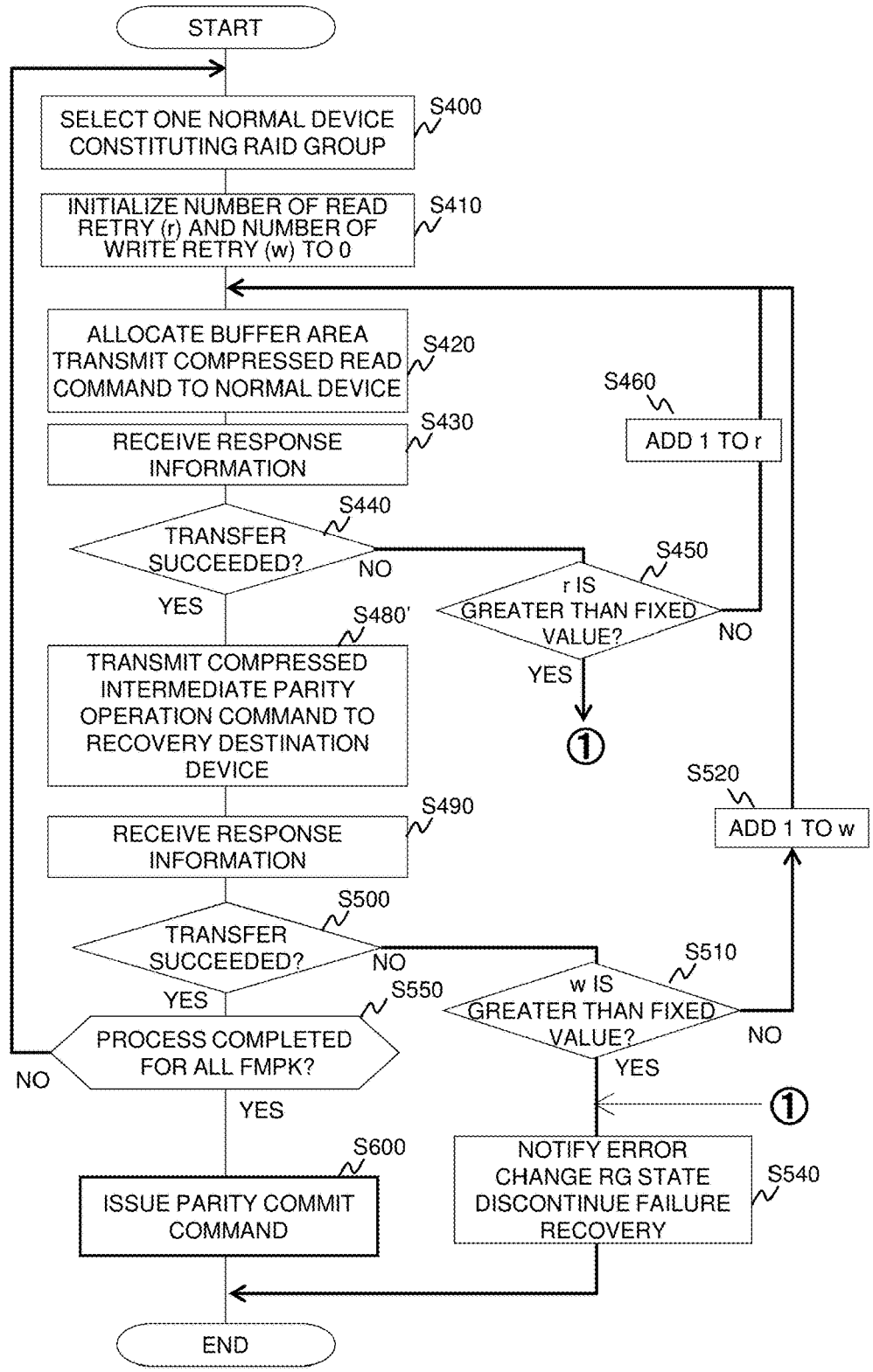
FIG. 29 is a detailed flowchart of correction copy performed in the storage system according to Embodiment 2 of the present invention.

Next, the flow of the processes of the correction copy performed in the storage system 1 according to Embodiment 2 will be described with reference to FIG. 29. This process is similar to the correction copy (FIG. 20) in Embodiment 1 so only the difference therefrom will be described.

At first, in the correction copy (FIG. 20) in Embodiment 1, the processor 11 in the DKC 10 has issued the compressed parity operation Write command to the recovery destination device (S480). According to the correction copy processing of Embodiment 2, the compressed intermediate parity operation command is issued to the recovery destination device (S480').

In the correction copy processing of Embodiment 2, after the processes of S410 through S500 were performed to all normal FMPKs 200 constituting the RAID group, a parity commit command is issued to the recovery destination device (S600), and the process is ended thereafter. The other points are the same as the correction copy processing in Embodiment 1. Further, the processes of FIGS. 17 19, 21 and 22 described in Embodiment 1 are the same as in the storage system 1 according to Embodiment 2.

In the correction copy processing of Embodiment 1, the recovery destination device keeps the number of times it has received the compressed parity operation Write command for each area (such as for each logical page number), and when the recovery destination device itself determines that the number of times it has received the compressed parity operation Write command reached a given number (the number of normal FMPKs 200 constituting the RAID group), it stores the restored data to the FMPK 200. On the other hand, according to the correction copy processing in Embodiment 2, the DKC 10 notifies the recovery destination device of the timing for storing the restored data to the FMPK 200, so that there is no need for the FMPK 200 to keep the number of times the compressed parity operation Write command (compressed intermediate parity operation command) was received. Therefore, according to the FMPK 200 of Embodiment 2, it is not always necessary to manage the number of times (T2503) in the staging information management table T2500.

Embodiment 3

Next, the storage system according to Embodiment 3 will be described. The configuration of the storage system 1 according to Embodiment 3 is the same as that of the storage system 1 according to Embodiment 1.

According to the storage system 1 of Embodiment 1, the stripe blocks belonging to the same stripe line was assumed to be stored in the same location (address) in the respective storage devices 200 (200'). According to the storage system 1 of Embodiment 3, a configuration is permitted where the respective stripe blocks belonging to the same stripe line can be stored in different locations (addresses) in the respective storage devices 200 (200').

The configuration example of the stripe line supported by the storage system 1 according to Embodiment 3 will be described with reference to FIG. 30. The configuration where the stripe blocks belonging to the same stripe line is always stored in the same location (address) in the storage devices 200 (200') is not an essential condition for enabling data recovery during failure of the storage device 200 (200'). From the viewpoint of data recovery, it is merely necessary for the respective stripe blocks belonging to the same stripe line to be stored in different storage devices 200 (200'). In the storage system 1 according to Embodiment 3, the respective stripe blocks within the stripe lines are arranged in the storage devices 200 (200') based on this rule. There are no other limitations.

Figure 30:
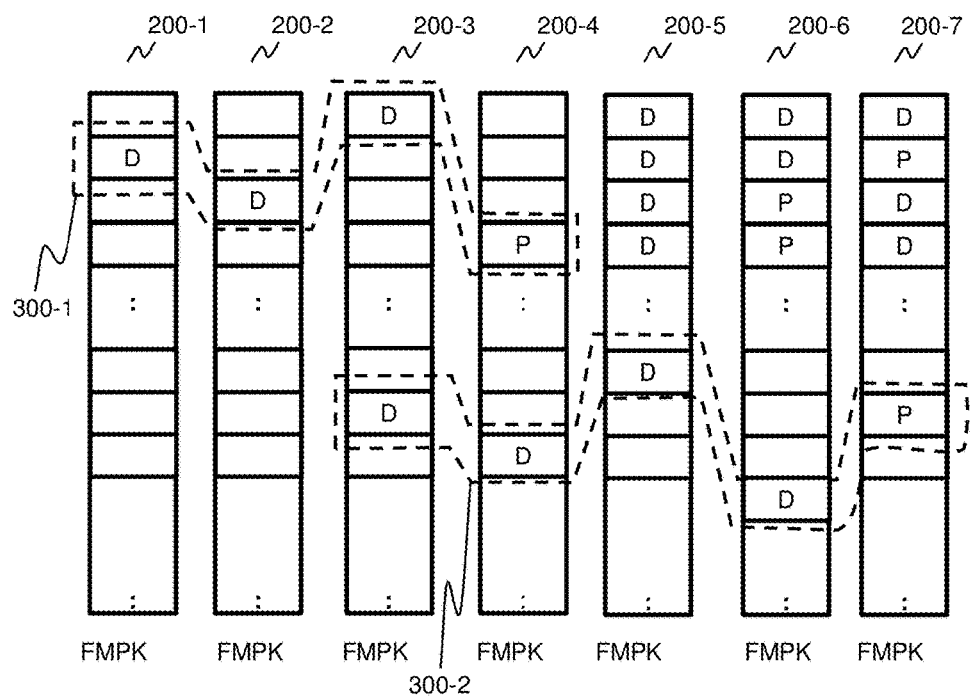
FIG. 30 is a view showing an example of a stripe line supported by the storage system according to Embodiment 3.

In FIG. 30, stripe line 300-1 is defined across FMPKs 200-1, 200-2, 200-3 and 200-4. The respective stripe blocks within the stripe line 300-1 are all in different locations in the FMPK 200. Further, stripe line 300-2 is defined across FMPKs 200-3, 200-4, 200-5, 200-6 and 200-7. Some of the locations on the FMPKs 200 of the respective stripes blocks in the stripe line 300-2 are the same (such as the stripe blocks in the FMPK 200-3 and the stripe blocks in the FMPK 200-7), and others are different.

According to the storage system 1 of Embodiment 3, as long as the rule that the respective stripe blocks belonging to the same stripe line are all stored in different storage devices 200 (200') is observed, the respective stripe lines can exist in any storage devices 200 (200').

In that case, even if one of the FMPKs 200, such as the FMPK 200-3, experiences failure and cannot be accessed (assuming that the other FMPKs are operating normally), since the FMPKs 200-1, 200-2 and 200-4 can be accessed, the stripe line 300-1 can be corrected based on the stripe blocks existing in the FMPKs 200-1, 200-2 and 200-4. Similarly, as for the stripe line 300-2, correction is possible based on stripe blocks existing in the FMPK 200-4, 200-5, 200-6 and 200-7.

In the following, we will describe the data recovery processing executed by the DKC 10 according to Embodiment 3. Since a major portion of this process is common to the process performed in the storage system 1 according to Embodiment 1 (or Embodiment 2), the flow of the processes will be described with reference to FIGS. 17 through 24. The areas where the same process as the data recovery processing according to Embodiment 1 are performed will not be described, and the differences with Embodiment 1 will mainly be described. In Embodiments 1 and 2, correction or copy recovery has been performed in logical page units, but in Embodiment 3, an example is described where correction or copy recovery is performed in stripe block units. However, even according to the storage system 1 of Embodiment 3, it is possible to perform correction or copy recovery in logical page units.

As mentioned earlier, according to the storage system 1 of Embodiments 1 or 2, the stripe blocks belonging to the same stripe line are all stored in the same location (address) in the storage devices 200 (200'). Therefore, the data recovery processing had been performed based on this assumption. In the storage system of Embodiment 3, since the stripe blocks belonging to the same stripe line may exist in different locations in the storage devices 200 (200'), when regenerating the data of the recovery source device by regeneration, it is necessary to identify the addresses in the storage devices storing the data necessary for performing correction.

In the storage system 1 according to Embodiments 1 or 2, the multiple storage devices 200 (200') are collectively managed using the concept of a RAID group. The stripe lines are not defined across storage devices belonging to different RAID groups. On the other hand, according to the storage system 1 of Embodiment 3, the stripe blocks belonging to the stripe line can exist in an arbitrary storage device, as long as the above-described rule is observed, so that there is no concept of RAID groups. In other words, the RG management table T1100 according to Embodiments 1 and 2 does not exist in the storage system 1 according to Embodiment 3.

Instead, the DKC 10 has a table for managing information related to the storage devices 200 (200') and the addresses within the storage devices in which the stripe blocks belonging to a stripe line exists, and the RAID configuration of the stripe line, for each stripe line (hereinafter, this table is called a stripe line management table; the contents of the stripe line management table are similar to the RG management table T1100, so the detailed descriptions thereof are omitted). According to the storage system 1 of Embodiment 1, the information of the RAID group to which the storage device belongs (the belonging RG # (T1003)) has been stored in the device management table T1000, but according to the storage system 1 of Embodiment 3, instead of the belonging RG # (T1003), a list of information (such as the identification number of the stripe line) regarding the stripe line to which the stripe blocks stored in the storage device is stored and managed in the device management table T1000.

When it becomes impossible to access one (or two) storage device(s) 200 (200') constituting the stripe line, the (one or more) stripe line(s) belonging to the storage devices 200 (200') that cannot be accessed are identified, and the storage devices 200 (200') and the locations within the storage devices 200 (200') in which the stripe blocks constituting the identified stripe lines belong are identified. Other than having this process performed, the data recovery processing according to Embodiment 3 is similar to the data recovery processing according to Embodiment 1.

The process similar to FIG. 17 described in Embodiment 1 (the overall flow of the data recovery processing) is performed in Embodiment 3, but since the management tables managed by the storage system 1 of Embodiment 1 and by the storage system 1 of Embodiment 3 differ, as mentioned earlier, the process of updating the management information (S100) differs. Further according to Embodiment 3, the correction or copy recovery is performed in each stripe block, so that one bit of a copy method bitmap T1506 in the copy management table T1500 corresponds to one stripe block, and that the (stripe size divided by logical page size) is added when adding the restored data size to the recovery completed offset (T1507) in the process of S80 differ from the process described in Embodiment 1. Other than that, the process similar to the one described in Embodiment 1 is performed.

Figure 31:
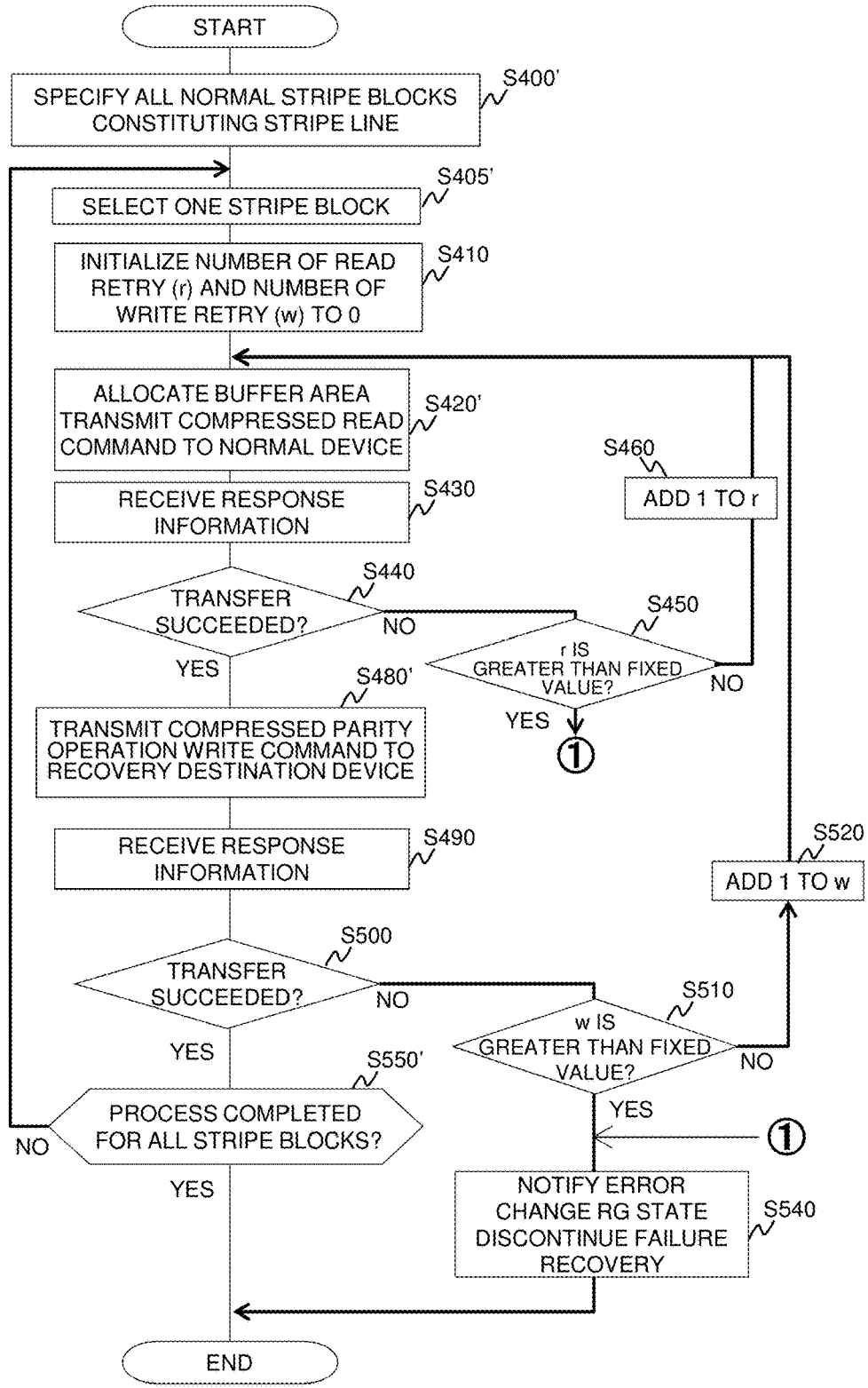
FIG. 31 is a detailed flowchart of correction copy performed in the storage system according to Embodiment 3.

Further, the process performed in S72 (correction copy) is slightly different from that described in Embodiment 1. In the following, the flow of the correction copy processing performed in the storage system 1 according to Embodiment 3 will be described with reference to FIG. 31.

At first, the processor 11 specifies the stripe line (hereinafter referred to as recovery target stripe line) to which the area specified by the recovery completed offset T1507 (logical page number) within the recovery source device belongs, and also specifies the device # of normal storage devices and all the addresses storing the stripe blocks belonging to the recovery target stripe line within the normal storage devices among all of the storage devices (FMPKs 200) in which stripe blocks belonging to the recovery target stripe line exist (S400'). This can be specified by referring to the stripe line management table and the device management table T1000.

Next, the processor 11 selects one of the sets of the "device # and address" specified in S400' (S405'). Thereafter, it executes S410 (initializes variables r and w).

Next, in S420', the processor 11 allocates the area corresponding to a single stripe block as an area for storing the read data to the buffer 131, and issues a compressed Read command designating the address also selected in S405' as the parameter (Read start offset 3002) to the FMPK 200 of the device # selected in S405'. At this time, a size corresponding to a single stripe block is designated as the Read size 3003 of the compressed Read command. Next, the processes of S430 through S460 performed thereafter are the same as those described in Embodiment 1.

In S480', the processor issues a compressed parity operation Write command to the recovery destination device. The parameters included in the compressed parity operation Write command supported in the storage system 1 according to Embodiment 3 will be described with reference to FIG. 32. In the parameters, the parameters of operation code 3201 through position within RAID group 3206 are the same as those described in Embodiment 1.

As for the parameters designated by the compressed parity operation Write command issued in S480', a value that the recover completed offset T1507 (logical page number) is converted to LBA is set as the Write start offset 3202. Further, a size corresponding to one stripe block is designated as the Write size 3203. Then, information of the area in the buffer 131 allocated in S420' is designated as the buffer address 3204. Further, the data size which was read in S420' and S430 (included in the response information (buffer use size 3013) of the compressed Read command received in S430) is designated as the transfer size 3205.

Figure 32:
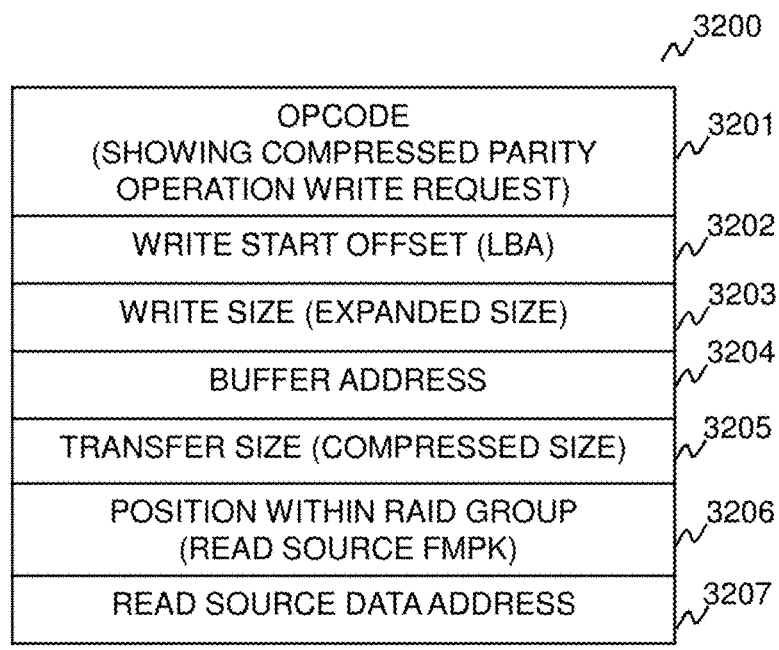
FIG. 32 is a view showing a format of a compressed parity operation Write command supported by the storage system according to Embodiment 3.

As shown in FIG. 32, a read source data address 3207 is added to the compressed parity operation Write command supported by the storage system 1 according to Embodiment 3. As described in Embodiment 1, the compressed parity operation Write command is a command for transmitting the data (in the compressed state) that the DKC 10 has read using the compressed Read command 3000 to the recovery destination FMPK 200, and for instructing the recovery destination FMPK 200 to compute the parity. The address where this read data (in compressed state) has been stored (address having stored the normal stripe block) is designated as the read source data address 3207.

The processes of S490 through S520 and S540 performed after S480' are the same as those described in Embodiment 1, so they will not be described here. After the determination of S500, the processor 11 determines whether the processes of S405' through S500 have been performed for all the stripe blocks specified in S400' (S550'). If there still remains a stripe block where the processes of S405' through S500 are not performed (S550': No), the processor 11 repeats the processes from S405' again. When the processes of S405' through S500 have been executed for all stripe blocks (S550': Yes), the process is ended.

Next, the flow of the process performed when the FMPK 200 according to Embodiment 3 receives the compressed parity operation Write command from the DKC 10 will be described. This process is substantially the same as the process described in Embodiment 1, so that only the differences therefrom will be described with reference to FIG. 23.

Among the processes of the compressed parity operation Write command executed in the FMPK 200 according to Embodiment 3, only the process regarding the DKC-DIF check (S2040) differs from Embodiment 1, and the other processes are the same.

The following checks are mainly performed as the DKC-DIF check in the FMPK 200 according to Embodiment 3.

a) Checking whether the CRC generated from the expanded data corresponds to the CRC within the DKC-DIF assigned to the expanded data.

b') Checking whether the read source data address 3207 included in the parameter of the compressed parity operation Write command corresponds to the address information included in the DKC-DIF.

d) Checking whether the sequence numbers within the DKC-DIF assigned to the respective 512-byte data are continuous numbers or not, when multiple 512-byte data is included in the expanded data.

The checks of a) and d) described above are the same as the DKC-DIF check performed in Embodiment 1. On the other hand, regarding b'), the FMPK 200 according to Embodiment 1 checks whether the Write start offset 3102 included in the parameter of the compressed copy Write command (or the compressed parity operation Write command) corresponds to the address information included in the DKC-DIF or not. However, according to the storage system 1 of Embodiment 3, since the stripe block belonging to the same stripe line may exist in different locations in the storage devices 200 (200'), it is worthless to compare the Write start offset 3102 with the address information included in the DKC-DIF. Therefore, the read source data address 3207 is included in the parameter of the compressed parity operation Write command used in the storage system 1 according to Embodiment 3. Further, during the check of the DKC-DIF performed in S2040, the address information included in the DKC-DIF and the read source data address 3207 are compared. The other points are the same as the process described in Embodiment 1.

The above describes the data recovery processing performed in the storage system 1 according to Embodiment 3. According to the storage system 1 of Embodiment 3, since the configuration is permitted where the stripe blocks belonging to the same stripe line are stored in different locations (addresses) in the storage devices 200 (200'), the degree of freedom of data arrangement is enhanced.

Especially when the storage device has a compression function, the amount of data that can be stored in the storage device differs, depending on the contents of the data being stored. If the storage device and the location (address) in the storage device in which the stripe blocks are stored are fixed, the increased storage area may not be utilized effectively even if the compression makes the available capacity in the storage device increased.

In the case of the storage system according to Embodiment 3, since the stripe blocks can be stored in arbitrary storage devices as long as the rule that the respective stripe blocks belonging to the same stripe line are all stored in different storage devices 200 (200') is observed, the storage area increased by compression can be utilized effectively, for example, by using the scheme that more stripe blocks are stored into specific storage devices when the capacity of the specific storage devices get increased by compression.

The preferred embodiments of the present invention have been described, but they are illustrated merely as examples of the present invention, and they are not intended to limit the scope of the invention to the embodiments illustrated above. The present invention can be performed in other various forms. For example, the storage system 1 described in the preferred embodiments adopts a configuration where the final storage media storing the write data from the host computer (host 2) are the FMPKs, which are storage devices using a flash memory, but the present invention is not restricted to storage devices using a flash memory as the final storage media. For example, it can be a storage device adopting a nonvolatile memory such as a Phase Change RAM, a Resistance RAM or the like.

The above description has been described assuming that the storage system 1 of Embodiment 1 or 2 adopts a configuration where the storage area of one RAID group is mapped to one or more logical units, but the present invention is not restricted to this configuration. For example, it is possible to adopt a configuration where one logical volume is mapped to multiple RAID groups.

Further, the preferred embodiments have been described assuming that the storage area of the logical unit provided to the host computer and the storage area of the RAID group are statically mapped (the storage area in the RAID group to which each storage area of the logical unit is mapped is determined uniquely at the point of time of definition), but the present invention is not restricted to a configuration where the relationship between the storage area of the logical unit and the storage area of the RAID group (or stripe line) is fixed. For example, it is possible to adopt a configuration where a logical unit is defined using a Thin-Provisioning technique, which is a well-known technique, and the storage are of the RAID group (or stripe line) is allocated to the storage area in the logical unit only when the write request to the storage area in the logical unit is received from the host computer.

The components described as programs in the embodiments can also be realized via a hardware using a hard wired logic and the like. It is also possible to adopt a configuration where the various programs in the embodiments are stored in storage media, such as CD-ROM, DVD and the like.

REFERENCE SIGNS LIST

1: Storage system
2: Host
3: SAN
10: Storage controller (DKC)
11: Processor
12: Host IF
13: Disk IF
14: Memory
15: Parity operation circuit
16: Interconnection switch
20: RAID group
200: Storage device (FMPK)
200': Storage device (HDD)
201: FM controller
202: Memory
203: Processor
204: Compression expansion circuit
205: Parity operation circuit
206: SAS-CTL
207: FM-IF 207
208: Internal connection switch
210: FM chip

The invention claimed is:

1. A storage system having a storage controller connected to a host computer, and multiple storage devices connected to the storage controller, wherein
the storage system is configured to:
constitute a RAID group from (n+m) number of the storage devices out of the multiple storage devices,
generate m number of redundant data for restoring n number of data from the n number of data received together with a write request from the host computer, and
store the n number of data and m number of redundant data to the (n+m) number of the storage devices constituting the RAID group; and wherein
when failure occurs to one of the storage devices constituting the RAID group,
the storage controller:
selects one recovery destination storage device from the multiple storage devices;
reads the data and the redundant data in a compressed state from each of the storage devices where failure has not occurred in the RAID group; and
transfers the data and the redundant data in the compressed state having been read to the recovery destination storage device.

2. The storage system according to claim 1, wherein
the storage device has a storage medium and a device controller;
when failure occurs to one of the storage devices constituting the RAID group, the storage controller issues a compressed Read command to each of the storage devices where failure has not occurred in the RAID group; and
when the device controller receives the compressed Read command from the storage controller, the device controller reads data stored in the storage device in the compressed state, and transfers the data in the compressed state to the storage controller.

3. The storage system according to claim 2, wherein
if the data is stored in the storage medium in a non-compressed state,
when the device controller receives the compressed Read command from the storage controller, the device controller compresses the data stored in the storage medium, and then transfers the data in the compressed state to the storage controller.

4. The storage system according to claim 2, wherein
the storage system is configured to store the n number of data and the m number of redundant data in the compressed state in the (n+m) number of storage devices; and
the device controller transfers the data in the compressed state stored in the storage medium to the storage controller when receiving the compressed Read command from the storage controller.

5. The storage system according to claim 2, wherein
the storage controller issues a compressed parity operation Write command to the recovery destination storage device when transferring the data or the redundant data in the compressed state to the recovery destination storage device; and
the recovery destination storage device having received the compressed parity operation Write command expands the data or the redundant data in the compressed state, computes a new parity based on the expanded data or redundant data and an intermediate parity generated when the compressed parity operation Write command has been received in the past, and stores the new parity as an intermediate parity to the storage device.

6. The storage system according to claim 5, wherein
if the recovery destination storage device having received the compressed parity operation Write command had not received the compressed parity operation Write command in the past,
the recovery destination storage device expands the data or the redundant data in the compressed state having been received together with the compressed parity operation Write command, and stores the expanded data as the intermediate parity to the storage device.

7. The storage system according to claim 5, wherein
the recovery destination storage device having received the compressed parity operation Write command keeps a count that the compressed parity operation Write command has been received, and at a point of time when the count in which the compressed parity operation Write command has been received reaches a given number, it stores the new parity as recovered data to the storage medium.

8. The storage system according to claim 5, wherein
when the recovery destination storage device receives a commit command, the recovery destination storage device stores the intermediate parity stored in the storage device as recovered data in the storage medium.

9. The storage system according to claim 5, wherein
the storage controller is configured to add a verification information to the data received together with the write request from the host computer and store in the storage device;
the recovery destination storage device having received the compressed parity operation Write command expands the data or the redundant data in the compressed state, performs data check using the verification information added to the expanded data, and
returns error to the storage controller when the verification result is not normal.

10. The storage system according to claim 9, wherein
the storage controller is configured to store address information of the storage device into the verification information when adding the verification information to the data received together with the write request from the host computer;
the compressed parity operation Write command includes the address information of the storage device to which the data or the redundant data in the compressed state had been stored; and
the recovery destination storage device having received the compressed parity operation Write command expands the data or the redundant data in the compressed state, and returns error to the storage controller when the address information included in the verification information added to the expanded data does not correspond to the address information included in the compressed parity operation Write command.

11. The storage system according to claim 1, wherein
when failure occurs to one of the storage devices constituting the RAID group,
if an accessible storage area exists in the storage area of the storage device in which failure has occurred, instead of reading the data and the redundant data from each of the storage devices in the RAID group where failure has not occurred,
the storage controller
reads data in the compressed state from the accessible storage area; and
stores the read data in the compressed state to the recovery destination storage device.

12. A storage device for receiving a data access request from a storage controller comprising:
a storage medium, and
a device controller; wherein
when the storage device receives a compressed parity operation Write command and data in a compressed state from the storage controller;
the storage device expands the data in the compressed state, calculates a new parity from the expanded data and an intermediate parity generated when the compressed parity operation Write command has been received in the past, and stores the new parity as an intermediate parity to the storage device.

13. The storage device according to claim 12, wherein
when the device controller receives a compressed Read command from the storage controller, the device controller reads data stored in the storage device in the compressed state, and transfers the data in the compressed state to the storage controller.

14. The storage device according to claim 12, wherein
the storage device having received the compressed parity operation Write command keeps a count that the compressed parity operation Write command has been received, and at the point of time when the count that the compressed parity operation Write command has been received has reached a given number, the storage device stores the new parity as recovered data into the storage medium.

15. The storage device according to claim 12, wherein
when the recovery destination storage device receives a commit command;
it stores an intermediate parity stored in the storage device as recovered data into the storage medium.

* * * * *